US006745224B1

(12) United States Patent
D'Souza et al.

(10) Patent No.: US 6,745,224 B1
(45) Date of Patent: Jun. 1, 2004

(54) OBJECT FRAMEWORK AND SERVICES FOR PERIODICALLY RECURRING OPERATIONS

(75) Inventors: David J. D'Souza, Kirkland, WA (US); Sabina Nawaz, Kirkland, WA (US); Erik Jon Snapper, Redmond, WA (US); Darren Mitchell, Seattle, WA (US); Raymond Edward Endres, Kirkland, WA (US); Teresa Martineau, Kirkland, WA (US); Bharat Shyam, Redmond, WA (US); Ian Michael Ellison-Taylor, Seattle, WA (US); Mohsin Ahmed, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/761,657

(22) Filed: Dec. 6, 1996

(51) Int. Cl.7 .............................................. G06F 15/16
(52) U.S. Cl. ..................... 709/202; 709/217; 709/218; 709/220; 709/224; 709/227; 707/3; 707/10
(58) Field of Search ................................ 395/680, 761, 395/712, 610, 603, 635, 183.14, 200.52, 200.54; 709/300, 303, 202, 217, 218, 220, 224, 227; 707/3, 10

(56) References Cited

U.S. PATENT DOCUMENTS

| 4,575,579 | A |   | 3/1986  | Simon et al.          |           |
|-----------|---|---|---------|-----------------------|-----------|
| 5,305,195 | A |   | 4/1994  | Murphy                |           |
| 5,347,632 | A |   | 9/1994  | Filepp et al.         |           |
| 5,491,820 | A |   | 2/1996  | Belove et al.         |           |
| 5,572,643 | A |   | 11/1996 | Judson                |           |
| 5,586,304 | A | * | 12/1996 | Stupek, Jr. et al.    | 717/170   |
| 5,630,139 | A | * | 5/1997  | Ozaki                 | 716/167   |
| 5,701,408 | A | * | 12/1997 | Cornell et al.        | 714/38    |
| 5,715,443 | A | * | 2/1998  | Yanagihara et al.     | 707/3     |
| 5,737,619 | A | * | 4/1998  | Judson                | 715/500   |
| 5,742,825 | A | * | 4/1998  | Mathur et al.         | 709/329   |
| 5,748,954 | A | * | 5/1998  | Mauldin               | 707/10    |
| 5,751,966 | A | * | 5/1998  | Dauerer et al.        | 709/224   |
| 5,774,667 | A | * | 6/1998  | Garvey et al.         | 709/222   |
| 5,777,558 | A | * | 7/1998  | Pennypacker et al.    | 340/635   |
| 5,784,555 | A |   | 7/1998  | Stone                 |           |
| 5,802,304 | A |   | 9/1998  | Stone                 |           |

FOREIGN PATENT DOCUMENTS

| EP | 0749081 A1   | 5/1996  |
|----|--------------|---------|
| WO | WO 96/30864  | 10/1996 |

\* cited by examiner

Primary Examiner—Nabil El-Hady
(74) Attorney, Agent, or Firm—Klarquist Sparkman, LLP

(57) ABSTRACT

A computer system includes an object oriented framework that provides a set of application integration interfaces that support programmatic updating operations for maintaining locally stored copies of resources such as hypertext document pages from remote servers on a computer network. The updating operations continually check for updates to the data at the remote server and download updated versions of the resources to maintain concurrency of the locally stored copy. The updating operations are performed while a connection to the remote network is left idle, to maximize usage of on-line connection time. The updating operations also can be programmatically scheduled by a client program of the updating operations. The updating operations include updating the contents of a folder or directory in a local file system as specified in a file at a remote server on the network, and providing automatically updating and populating groups of sites or document pages organized by category.

35 Claims, 10 Drawing Sheets

OBJECT FRAMEWORK AND SERVICES FOR PERIODICALLY RECURRING OPERATIONS

FIELD OF THE INVENTION

This invention relates generally to an object-oriented software framework that provides services to support periodically recurring operations, including change monitoring and updating of locally stored copies of remote documents so as to be available for off line use.

BACKGROUND AND SUMMARY OF THE INVENTION

In many software applications, it is necessary or desirable to perform operations on a periodically recurring basis. Further, it is desirable to perform such operations without requiring continuing user action to activate the operations, or in other words while unattended by the user. An example is a hard disk utility application such as a disk checker, defragmenter or virus scanner. These utility applications are desirably executed automatically on a periodically recurring basis (e.g., daily, weekly or just once per month) to prevent degradation of disk performance over time as a result of normal usage. Further, the user desirably is not forced to track when these operations are done, or to manually initiate the operations.

Typically, applications that perform operations on a periodically recurring basis have each implemented their own mechanisms to schedule the recurring operations, initiate the operations on the scheduled basis, and monitor the results. In an electronic mail application for example, mail software at a client computer on a network may include code to periodically check for new messages at a mail server on the network. If there are new messages, the client mail software transfers the mail messages to the client computer from the network's mail server and may also display a notice to the user that a new message has arrived.

This typical practice of each application separately implementing mechanisms to support periodically recurring operations has several drawbacks. In order for the application to perform the periodically recurring operations while unattended by a user, the application must remain loaded and running on the computer. Because the application often does no useful work while waiting to perform its next periodically recurring operation, leaving the application running is wasteful of the computer's memory and processing capacities which could otherwise be used by other applications. If too many such applications are left running, the user may be unable to run applications for the user's immediate work activities, such as a spreadsheet, word processor or browser.

Another drawback is that this typical approach makes programming of periodically recurring operations more difficult. The mechanism that supports scheduling, initiating and monitoring of the periodically recurring operation is separately implemented in each application, often from scratch.

A software utility called the "system agent" in the Microsoft® Windows® 95 operating system operates as a general mechanism to trigger applications (e.g., a disk checker or defragmenter utility) according to a preset schedule of times. The system agent provides user interface dialogs in which the user selects a schedule of times (e.g., daily at 2 am, Tuesdays and Fridays at 4:30 pm, 9 pm on the third day of every month, etc.) at which to run a desired program (the "scheduled program"). When its user interface is closed, the system agent runs as a background task. When the scheduled program's next scheduled time arrives, the system agent loads and runs the scheduled program (using the CreateProcess API of Microsoft's Win32 API set). The scheduled program thus can perform a periodically recurring operation when it is run by the system agent at each of its scheduled times. When the operation is complete, the scheduled program must self terminate. Programs that implement a recurring operation thus are not left running between the scheduled times, which frees the computer's memory and processing capacity for use by other applications.

The Windows® 95 system agent utility has several drawbacks which limit its use by applications to provide periodically recurring operations. One drawback is that there are limited ways in which an application program can interact with the system agent utility. In general, each scheduled program is scheduled with the system agent by user input to the user interface of the system agent. Alternatively, the system agent stores information on the times of scheduled programs in a system registry. (The system registry is a database file which stores configuration information for the operating system.) An application program therefore can schedule a program that implements a desired recurring operation with the system agent by adding entries containing appropriate scheduling information into the system registry. Further, once the system agent starts the program at the scheduled time (using the CreateProcess API), the system agent does not further interact with the program. Also, if the scheduled program is scheduled by an application adding entries to the system registry, the system agent provides no way for that application to further interact with the scheduled program at the scheduled times. Thus, an application program is not able to programmatically schedule an operation with the system agent utility, programmatically control the performance of the operation at its scheduled times, or receive notifications to monitor the operation.

The present invention includes an object-oriented framework that provides a set of object integration interfaces which support programmatic scheduling, configuring, and notifications of periodically recurring operations. In other words, the framework acts as a system service or application programming interface to access services for an application program to schedule, configure, and subscribe to notifications from an agent program that implements a desired periodically recurring operation, and especially operations for change monitoring and updating of data.

The object-oriented framework in an illustrated embodiment of the invention includes a scheduler object that provides a set of integration interfaces with which a client application can programmatically schedule on a periodic basis initiating operations by an agent object in which the operations are implemented. A core object in the framework provides additional interfaces with which any client application can subscribe to receive notifications from the agent relating to the operation. The framework further defines interfaces for agent objects and for a call back object of the client application. The interfaces on the agent objects allow the client application to programmatically set options controlling the operation that the agent performs. The interfaces on the client application's call back object allow the client application to receive notifications from the agent as the operation is performed. The interfaces on the agent objects and client application call back objects also allow the framework to persisently store a state of the agent objects and client application call back objects so that the client application and agent objects can be terminated and unloaded from memory until the time for the operation arrives.

The object oriented framework of the invention overcomes many of the drawbacks of prior art mechanisms for performing periodically recurring operations. The framework allows a client application to programmatically control scheduling of the operation, and set options controlling the operation itself. The framework also allows client applications, including applications other than the client application which schedules a periodically recurring operation, to receive notifications and alerts pertaining to the operation. Additionally, the framework allows agent software in which the operation is implemented and the client application which schedules the operation to be terminated between times that the operation is performed, so as to free memory and processing capacity for use by other active applications.

A particular use of the framework is in a network environment, such as the Internet, to provide monitoring of data residing at a remote server for changes ("update checking"), and to download changed data to a user's computer so as to maintain an updated local copy of the data at the user's computer. The illustrated framework provides agent objects which implement various forms of such updating operations. These updating operations include an operation (herein called "smart folder updating") to update the contents of a local folder (herein called a "smart folder") as specified in a remote file. The updating operations also include an operation (herein called automatically populating and updating favorites categories) that automatically fill and periodically update lists of remote documents for a user to browse organized in categories.

The scheduler in the illustrated framework supports scheduling of an agent's updating operations on different periodic bases, which include at scheduled times and during network idle times. The scheduled times are times scheduled by the user at which the updating operation is automatically triggered by the scheduler to connect to the Internet or other network unattended, and perform the updating operation. The scheduler also can perform the update operations on a periodic basis by detecting times when the user is connected to the Internet for other activities (such as on-line browsing) and the connection is left idle. When such idle status is detected, the agent for the update operation automatically performs the update checking and downloading over the connection unattended as background processing to the user's other activities.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

1. Computer Overview

Figure 1:
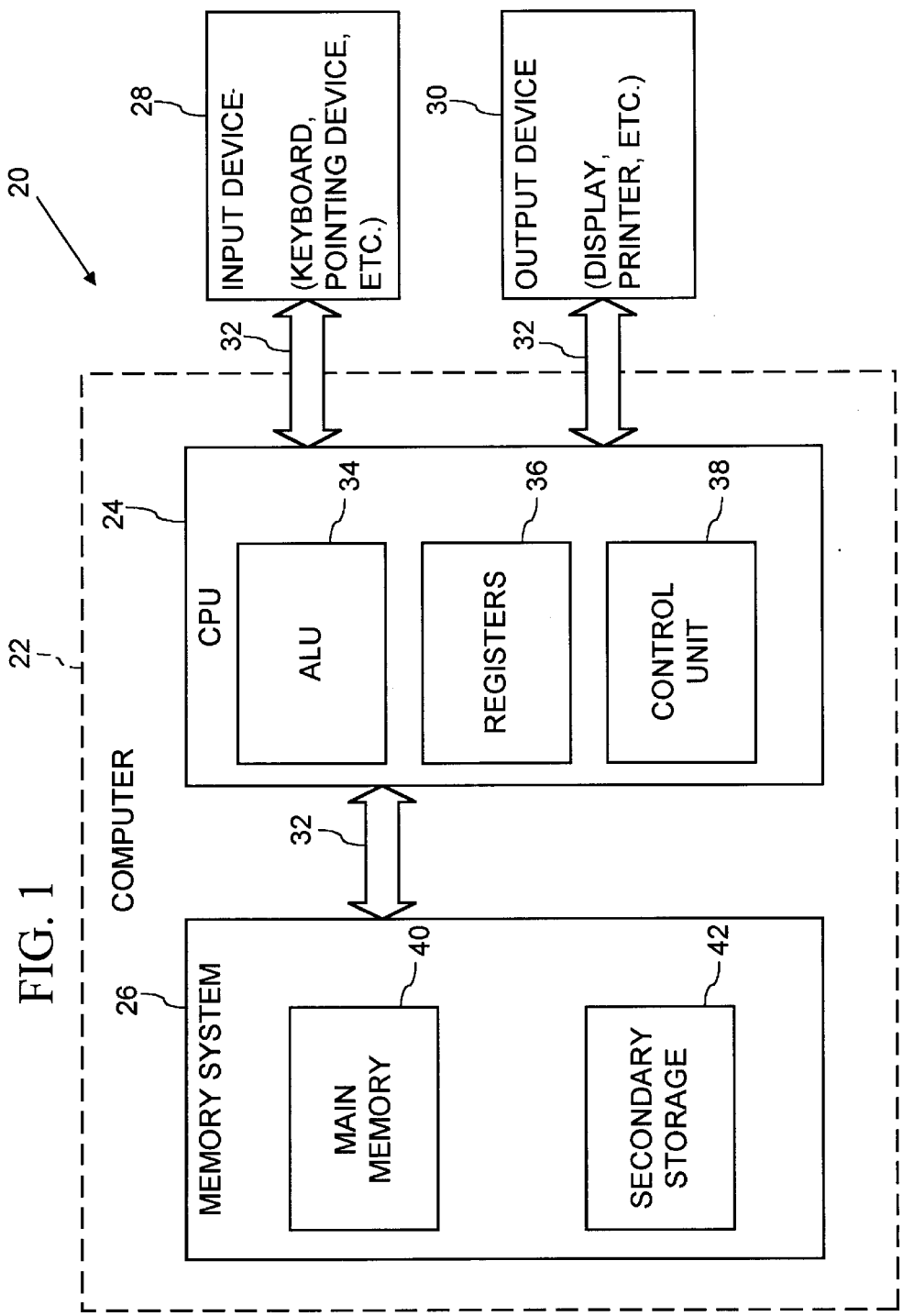
FIG. 1 is a block diagram of a computer system that may be used to implement a method and apparatus embodying the invention for an object-oriented framework supporting programmatic periodically recurring operations.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

2. Browser and Updating Operations Overview

Figure 2:
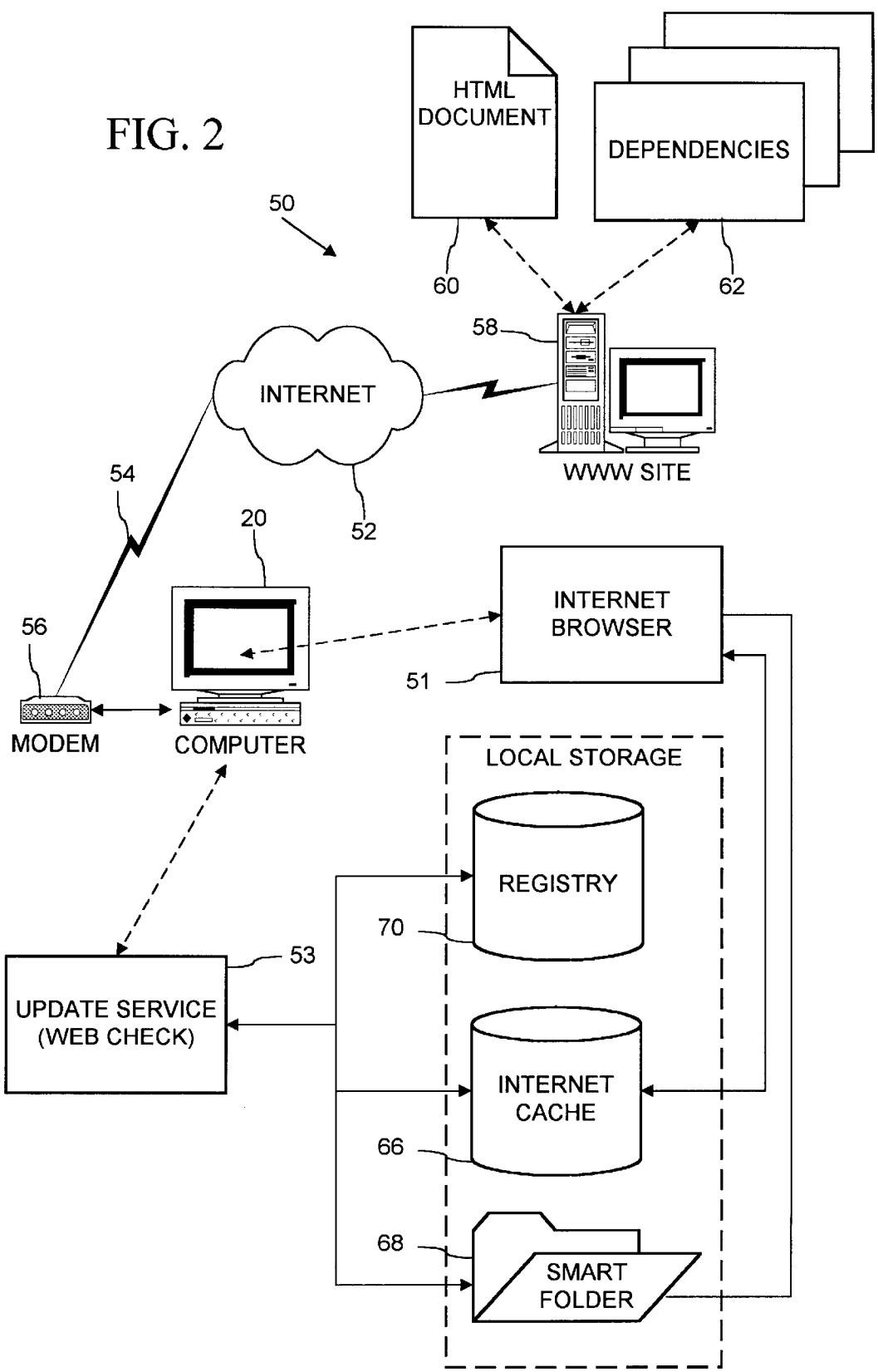
FIG. 2 is a diagram illustrating a browsing system including the computer of FIG. 1 which uses an object-oriented framework illustrated in FIG. 9 to provide periodically recurring change monitoring and updating operations according to an illustrated embodiment of the invention.

In an off-line browsing environment 50 of an illustrated embodiment of the invention shown in FIG. 2, the computer 20 (also shown in FIG. 1) runs software, referred to herein as a "browser" 51, which provides on-line and off-line browsing of electronic documents and other data from a remote computer network 52. The browser 51 can be integrated with the operating system software, or can be a separate application software. The illustrated browser 51 is the Microsoft® Internet Explorer browser. The computer 20 also runs services software, herein called "Web Check" 53, which provides an object-oriented framework (shown in FIG. 10 and described more fully below) with programmatic access for client applications (such as the Internet browser 51) to services supporting periodically recurring operations. The operations in the illustrated browsing environment are updating operations that provide change monitoring and updating of data by downloading from the network 52.

The illustrated remote computer network 52 is the Internet. The Internet is a well known, global network of cooperatively interconnected computer networks. The World-Wide Web portion of the Internet is a collection of server computers (referred to as "World-Wide Web sites") on the Internet which store electronic documents in a hypertext mark-up language ("HTML") format that can be publicly accessed by computer users having a connection to the Internet. There are many such World-Wide Web sites on the Internet.

In the illustrated browsing environment 50, the computer 20 connects to the computer network 52 over a telephone line 54 with a modem 56. Other physical connections to the computer network alternatively can be used, such as an ISDN, T1 or like high speed telephone line and modem, a television cable and modem, a satellite link, an optical fiber link, an Ethernet or other local area network technology wire and adapter card, radio or optical transmission devices, etc. The invention can alternatively be embodied in a browsing environment for other public or private computer networks, such as a computer network of a commercial on-line service, a local area network (LAN), an intranet, or like computer network.

Documents for browsing with the illustrated browser can reside as files of a file system stored in the computer's secondary storage 42 (FIG. 1), or reside as resources at a remote computer 58 (also referred to as a "site") connected to the computer network 52, such as a World-Wide Web site on the Internet. The illustrated document 60 residing at the site 58 conforms with HTML standards, and may include extensions and enhancements of HTML standards. HTML documents are ASCII coded (a well known standard for coding alpha-numeric characters in 7- or 8-bits) character files generally consisting of text and HTML "tags" which specify formatting of the document, links (referred to as "hyper-links") to related documents, and other files that contain information (e.g., sound, images, video, etc.) which is to be combined into the document, among other tag features. Typical HTML documents found on the world wide web include both text and tags specifying files for several images that are to be displayed with the text.

In conformance with HTML, the illustrated document 60 can incorporate other additional information content 62, such as images, audio, video, executable programs, etc. (hereafter called "dependencies" 62), which also reside at the remote computer 58. The document 60 and dependencies 62 preferably are stored as files in a file system of the remote computer 58. The document 60 incorporates the dependencies 62 using HTML tags that specify the location of files or other Internet resource containing the dependencies on the Internet 52.

When browsing the HTML document 60 on-line (i.e., while connected to the network), the illustrated browser 51 retrieves the document from its site 58 on the Internet using the well-known windows sockets network programming interface (also known as "winsock"). In the Microsoft® Windows 95 operating system used on the illustrated computer 20, the Windows sockets network programming interface is implemented in a software module named wsock32.dll. Windows sockets, in turn, relies on a set of Internet communications protocols which are implemented in one or more other software modules, such as in a network protocol driver and a modem driver. These Internet protocols can include application protocols, such as File Transfer Protocol (FTP), Simple Mail Transfer Protocol (SMTP), Hyper Text Transfer Protocol (HTTP), Gopher, etc.; transport protocols, such as the Transmission Control Protocol (TCP) and the Internet Protocol (IP) protocol suite; and connection protocols, such as the Serial Line Protocol (SLIP) or the Point-to-Point Protocol (PPP). Alternative embodiments of the invention for browsing documents on other networks may utilize various other network protocols, such as the NetBIOS Extended User Interface(NetBEUI) by IBM Corporation, Internet Packet Exchange/Sequenced Packet Exchange (IPX/SPX) by Novell corporation, DECnet, by Digital Equipment Corporation, NetBIOS by Microsoft Corporation, and OSI/TP-4, among others. After retrieving the document 60 from the site 58, the browser 51 processes the HTML data to generate a view of the document, which the browser then displays on the computer's screen 30 (FIG. 1). The browser stores a copy of any documents with their dependencies which are browsed on-line in an Internet cache 66 in the computer's local storage 42.

The browser 51 also can be operated off-line (i.e., when the computer 20 is disconnected from the network 52) to browse documents which are stored locally at the computer 20. In addition to documents which are cached by the browser during on-line browsing, documents also are locally stored by Web Check 53 for off-line browsing (i.e., browsing while disconnected from the network 52) using the browser 51.

Web Check 53 is an object-oriented framework including a set of software modules that is described below with reference to FIG. 9. As described more fully below, Web Check 53 includes a core set of software modules with interfaces for a client application program to set up, schedule and monitor periodically recurring operations implemented by an agent program. In the illustrated system 50, the agent programs implement operations that serve to monitor for changes or to periodically update data in the system.

Specifically, the agent programs in the illustrated system implement updating operations for use by the operating system and application software (such as the browser 51) to automatically monitor a specified document (e.g., HTML document 60) residing at a remote site on a computer network for changes and maintain an up-to-date locally stored copy of the document for later off-line use. In alternative systems employing the Web Check framework, agent programs can implement other periodically recurring operations that differ from those in the illustrated system. Generally, although not necessarily, the periodically recurring operations serve to monitor for a change in the system or to maintain updated data in the system. For example, alternative systems can include agent programs that monitor for changes to files stored locally rather than remotely as in the illustrated system 50.

The updating operations provided using the Web Check framework 53 in the system 50 maintain locally stored copies of documents in either the Internet cache 66 or in file system folders which are designated as "smart folders" 68. Web Check 53 thus provides a continually updated local copy of a document for off-line use, such as for off-line browsing using the browser 51.

In one embodiment of the invention, the updating operations to be performed by Web Check 53 are identified by entries in a system registry 66. In the Microsoft® Windows® operating system, the system registry is a database which stores configuration information for the operating system, including information to enumerate and track applications, device drivers, and operating system control parameters. For a detailed discussion of the registry, see *Win32 Programmers Reference*, Vol. 2, published by Microsoft Press, Redmond, Wash. (1993). Web Check 53 performs the updating operations, and stores identifying entries for the updating operations in the registry on a per-user basis under an HKeyCurrentUser registry key in the registry 70.

Each of the registry entries for Web Check 53 stores three pieces of data, a "flags" double word value, a "path" text string, and a "URL" text string. The flags value contains bits which can be set to specify the particular updating service to be performed by Web Check. The path string is a file system path name of a folder in the local storage 42 of the computer 20. The URL string is a URL of a file on a remote World-Wide Web site 58. The definitions of the flag value bits for Web check registry entries in the illustrated system 50 are listed in the following Table 1. The updating operations specified by setting these flags value bits are described in more detail in subsequent sections.

TABLE 1

Definition of Flags Value Bits

| Bit | Definition |
|---|---|
| 0 | The registry entry specifies a smart folder updating service described in the "Smart Folders Updating Operation" section below. The path string refers to a file system directory which is a smart folder. The URL string refers to a file on a remote server, called a "folder descriptor file," which Web Check uses in the smart folder updating service to update the smart folder. |
| 1 | The registry entry specifies an updating service for Internet Shortcuts kept in a local folder. The path string refers to the local folder which contains the Internet Shortcuts that are updated with this service The URL string is not used, and may be omitted. |
| 2 | This bit is set in conjunction with bit 1 to specify the updating service is for Internet shortcuts in sub-folders of the local folder |

TABLE 1-continued

Definition of Flags Value Bits referred to by the path string.

A set of sample registry entries for Web Check 53 is as follows:
\HKCU\Software\Microsoft\Windows\CurrentVersion
　\WebCheck
　　\0000
　　　(REG_DWORD) Flags=0x0000001
　　　(REG_STRING) Path="c:\program files\msn\unplugged"
　　　(REG_STRING) URL="http://www.msn.com"
　　\0001
　　　Flags=0x00000001
　　　Path="c:\windows\favorites"
　　　URL="http://www.hotlinks.com/favs.htm"
　　\xxxx
　　　Flags=0x0000003
　　　Path="c:\windows\desktop"
　　　URL=" "

Figure 3:
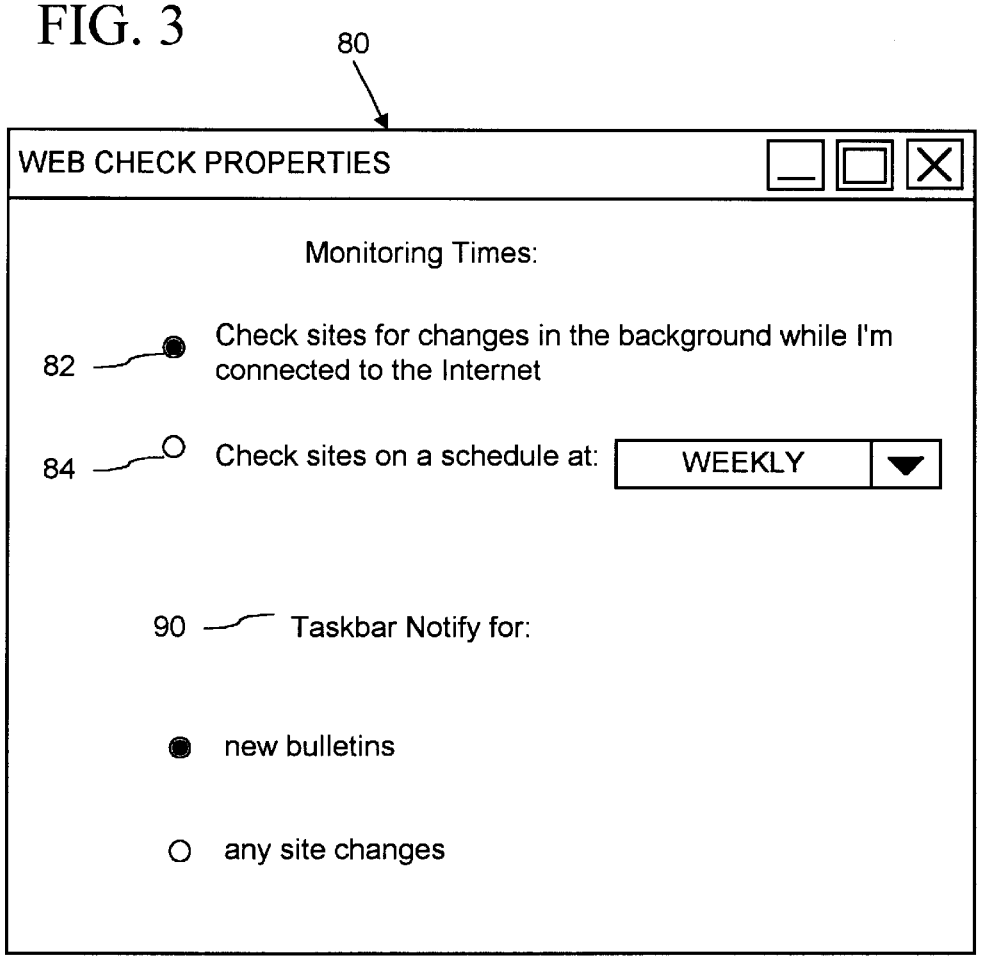
FIG. 3 is a view of a user interface dialog for setting user options of the framework.

With reference to FIG. 3, Web Check 53 (FIG. 2) performs the updating operations specified in the Web Check entries of the system registry 70 (FIG. 2) on either a scheduled basis or during idle connection times at the user's option (referred to as the "monitoring time" option). The user sets this and other options 90 in a Web Check properties dialog 80, such as by clicking on a desired setting of each option with the mouse or other input device. For example, the user sets the monitoring time option to the idle connection times setting by clicking on a radio button control 82 next to the caption "Check sites for changes in the background while I'm connected to the Internet." Alternatively, the user can set the monitoring time option to the scheduled basis setting by clicking on another radio button control 84, and entering a schedule of times in a list box control 86. Alternative embodiments of the invention can present additional Web Check options.

When the user sets the monitoring time option to idle connection times, Web Check 53 is loaded to run on the computer 20 whenever the Internet browser 51 or other application software loads the windows sockets module (wsock32.dll) to connect to the Internet 52. As described above, the Internet browser 51 uses the windows sockets module as a network programming interface for connecting to and communicating on the Internet 52. During the user's on-line session, Web Check 53 monitors the computer's connection to the Internet 52 to detect times when the connection is left idle (i.e., when the application. software is not transmitting or receiving data on the connection to the Internet). At such times, Web Check 53 performs the update operations specified in the registry entries described above, e.g., checking remote documents for changes and downloading updated documents to local storage.

In the illustrated system 50, Web Check 53 detects idle times using services provided by the windows sockets network programming interface. Communications through windows sockets over the Internet connection are made through what are called "ports" or "sockets." Windows sockets tracks a time of the last activity occurring on each port, and provides a network programming interface for other software modules to query windows sockets for this "last activity" time. In the illustrated system, the the windows sockets provides network programming interfaces for applications to query the last activity time, which have the following form:

GetSockOpt (SO_IDLE)
getsockopt( SO_IDLE)

The former of these two network programming interfaces returns a value indicating the time that a last transaction occurred on a non-idle time socket (i.e., on any socket not marked as an "idle time socket" as described below). The latter of the above windows sockets network programming interfaces returns a value indicating the time elapsed since the last activity on a non-idle time socket. This latter time is derived by subtracting the last activity time from a current system time. Web Check periodically polls these windows sockets interfaces to determine how long the connection has been idle.

Although the Internet browser can commence new communications over the port at any time, the length of time that the connection has been idle is a good indication of how long the connection is likely to remain idle before the next communication commences. Specifically, the longer the connection has been idle—the more likely it is to continue to remain idle. This relationship reflects how a connection is used during on-line browsing. In general, when a user browses to a new document on-line, the browser engages in a series of rapid data exchanges with servers on the Internet, which include: requesting a connection to a name server; receiving a response; requesting translation of a URL identifying the document from the name server; obtaining a Internet Protocol (IP) address in response; requesting a connection to a World-Wide Web site where the document resides using the IP address; receiving a response; requesting to download the document from the site; receiving the document; requesting any images or other files referenced in the document (also known as the document's "dependencies"); and receiving the dependencies. Between each of these exchanges, there may be a short pause (typically a fraction of a second up to several seconds). On the other hand, once the document and its dependencies have been downloaded, the user usually reads or views the document for a much longer duration before browsing to another document. In which case, the delay until the browser resumes communications over the connection can be several minutes.

Based on this relationship, Web Check 53 uses the elapsed time since the last activity time obtained from windows sockets to determine when the connection is idle. More particularly, Web Check 53 determines that the connection is idle when this elapsed time exceeds a predefined threshold interval or intervals. At such times, Web Check 53 downloads data from the Internet 52 for the updating operations specified in the Web Check entries of the system registry 70 (FIG. 2). Web Check 53 performs these downloads over a separate port (the "idle time port") than that used by the Internet browser, and sets parameters for the port such that windows sockets does not track the last activity time of the downloads using the idle time port. This allows Web Check to continue monitoring the elapsed time from the Internet browser's last activity time for idle time detection. In the illustrated system, the windows sockets provides the following network programming interfaces for Web Check 53 to mark the port it uses for idle time downloading as the idle time port:

SetSockOpt(SO_IDLE)
setsockopt( socket s, SO_IDLE)

In the illustrated system 50, Web Check 53 uses different predefined threshold intervals for idle time detection depending on the expected duration of each updating service download. In particular, Web Check 53 triggers updating service downloads with short expected durations (hereafter "short term idle time events") when the elapsed time from the last activity time exceeds a short delay interval (e.g., about two seconds). These short term idle time events may include, for example, downloading update information of documents (e.g., last changed date) and downloading smaller documents. For updating service downloads with longer expected durations (hereafter "long term idle time events"), Web Check 53 uses a longer delay interval (e.g., ten seconds). These long term idle time events may include downloading updated versions of complete documents and their dependencies to the local storage 42 (FIG. 2). Generally, Web Check 53 triggers one or more short term idle time events (if any are pending) at the beginning of an idle period. Later in the idle period after sufficient time has elapsed from the last activity time, Web Check 53 triggers any long term idle time events. For higher bandwidth connections (e.g., an ISDN line or cable modem), Web Check 53 automatically scales down the delay threshold intervals.

In alternative embodiments of the invention, Web Check 53 can determine the idle times using different delay intervals (e.g., a longer 30 second interval), and without consideration to the size of the download.

When the monitoring time option is set to a scheduled basis, Web Check 53 is loaded and run at scheduled times by scheduler software (not shown). The scheduler software in the illustrated system 50 is the system agent application software of the Microsoft Windows 95 operating system. The system agent application software can be set at the user's option to load and run Web Check on any of a variety of bases, such as at a particular hour on a daily, weekly, monthly or like basis. Thus, for example, the user can have Web Check activated on a scheduled basis at times that the computer would otherwise be idle, such as during early morning hours.

When activated at the scheduled times, Web Check 53 automatically connects to the Internet 52 using the windows sockets network programming interface. Web Check 53 then iterates through the Web Check entries in the system registry 70 (FIG. 2) and performs each of the updating operations specified therein. When the updating operations are complete, Web Check 53 disconnects from the Internet 52 and shuts down.

Web Check 53 thus performs automated updating of locally stored copies of documents from the Internet 52, by unattended downloading of data from the Internet either at scheduled times or at detected idle on-line times. This provides automatically updated, locally stored copies of documents and other files from the Internet for off-line use.

3. Smart Folders Updating Operation

Figure 4:
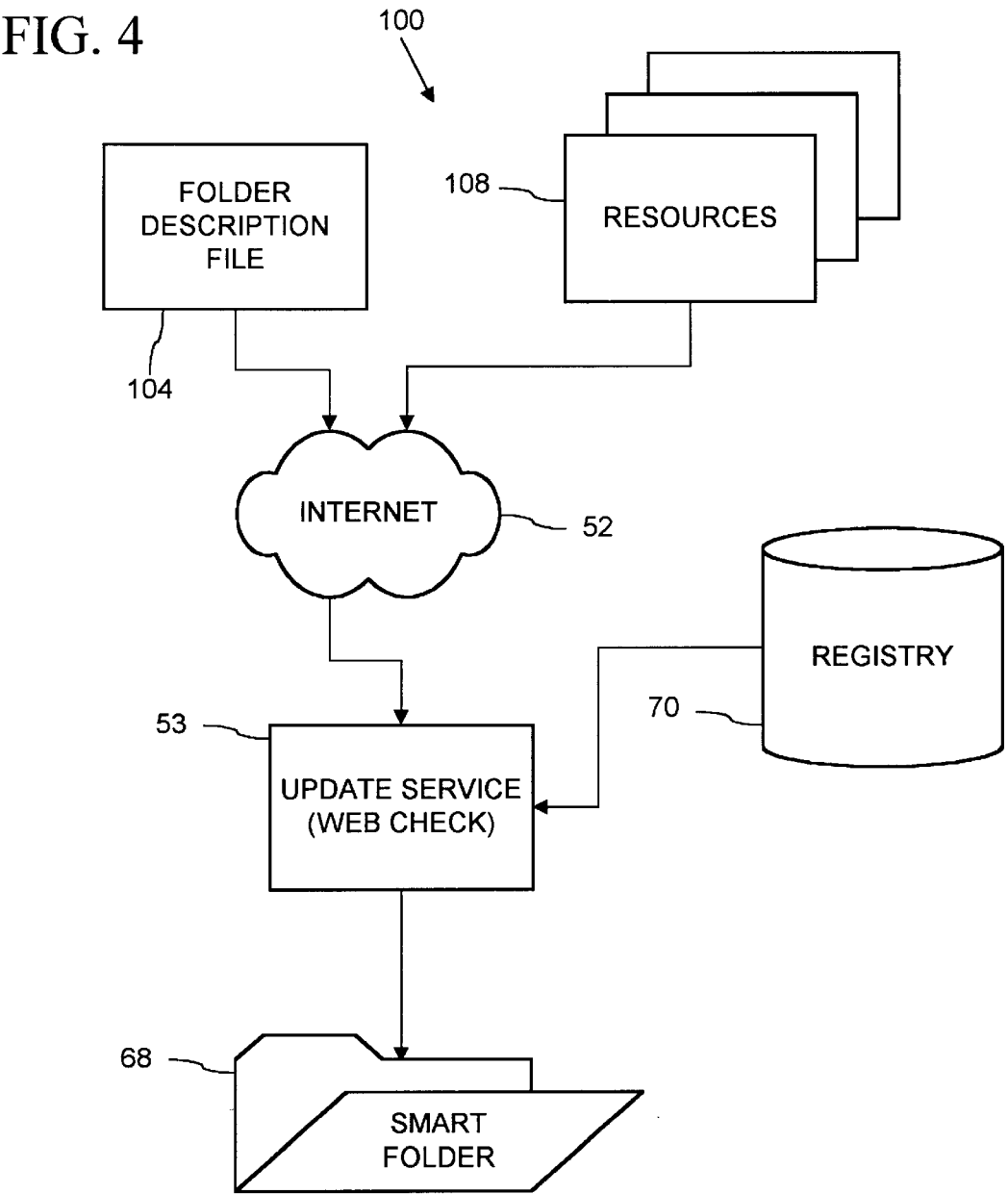
FIG. 4 is a data flow block diagram illustrating a smart folder updating operation provided in the browsing system of FIG. 2.

With reference now to FIG. 4, Web Check 53 (FIG. 2) provides an updating operation 100 herein referred to as a "smart folder updating." In accordance with this updating operation, Web Check 53 updates the contents of a local folder 68 (the "smart folder") based on a file 104 (the "web collections file" or "WCF") residing on a remote server (e.g., World-Wide Web site 58 of FIG. 2) that specifies the contents of the smart folder. As described above, the local folders that are to be updated by Web Check 53 with the smart folder updating service are identified by entries in the system registry 70 which have the 0-bit of the flag value set. As stated in Table 1 above, the path string in this registry entry identifies the folder 68 in the file system of the local storage 42 (FIG. 2), while the URL string identifies the WCF 104 at the remote server 58 (FIG. 2).

The illustrated WCF 104 can contain any of three main sections, which are as follows:

Files To Download.

This section contains a list of resources 108 (such as documents, images, and other files) that Web Check 53 is to download from the remote server 58, and locally store as files in the smart folder 58 in the local storage 42 (FIG. 2). The resources 108 are listed in statements having in the form of "<local path name>=<URL>." The local path name is a file system path name relative to the smart folder 68 which designates a file location in the smart folder or in any of the theme folder's sub-folders. The URL designates the resource at the server 58 which is to be downloaded and stored at the designated local storage location.

URLs To Create.

This section contains a list of URLs that Web Check 53 is to store as Internet Shortcuts (described below) in the smart folder 68 or sub-folder thereof. The URLs are listed as statements which include a local path name, an '=' character, a URL, and a comma delimited list of Internet Shortcut properties. As with the Files to Download section, the local path name designates a location to store the Internet Shortcut in the smart folder 68 or its sub-folders, whereas the URL is the URL to be stored as the Internet Shortcut at that location.

Cache Only.

This section contains a list of URLs which designate Internet resources 108 that Web Check 53 is to download and store in the Internet cache 66. If the URL designates a file in hypertext mark-up language (HTML) format, the Web Check updating operation parses the HTML file and also caches any other files (referred to herein as "dependencies" of the HTML file) which are referenced in the HTML file for incorporation into a hypertext page defined by the HTML file. Hypertext pages in the HTML format are ASCII encoded files which employ tags to designate text formatting, hyperlinks, and multi-media resources (the file's "dependencies") to be incorporated from other resources (e.g., files) into the document. Web Check 53 also creates entries in an URL section of the registry 66 to track the cached files designated in the Cache Only section of the WCF.

The following is a listing of a sample WCF.

[Files to download]
image1.gif=http://www.foo.com/images/7-29-96.gif
image2.gif=http://www.foo.com/images/9-22-06.gif
/Sports/basketball.gif=http://www.foo.com/images/image.gif

[URLs to Create]
"University of Waterloo"=www.waterloo.ca, cache="sticky",
author="Teri Martin", category="education"
"ESPNet"=www.espnet.com, cache="sticky", author=
"StarwaveCorp", category="Sports"
News/"Globe and Mail"=www.Globemail.ca, cache=" ", author=
"Editor's at the Globe", category="news"

Figure 5:
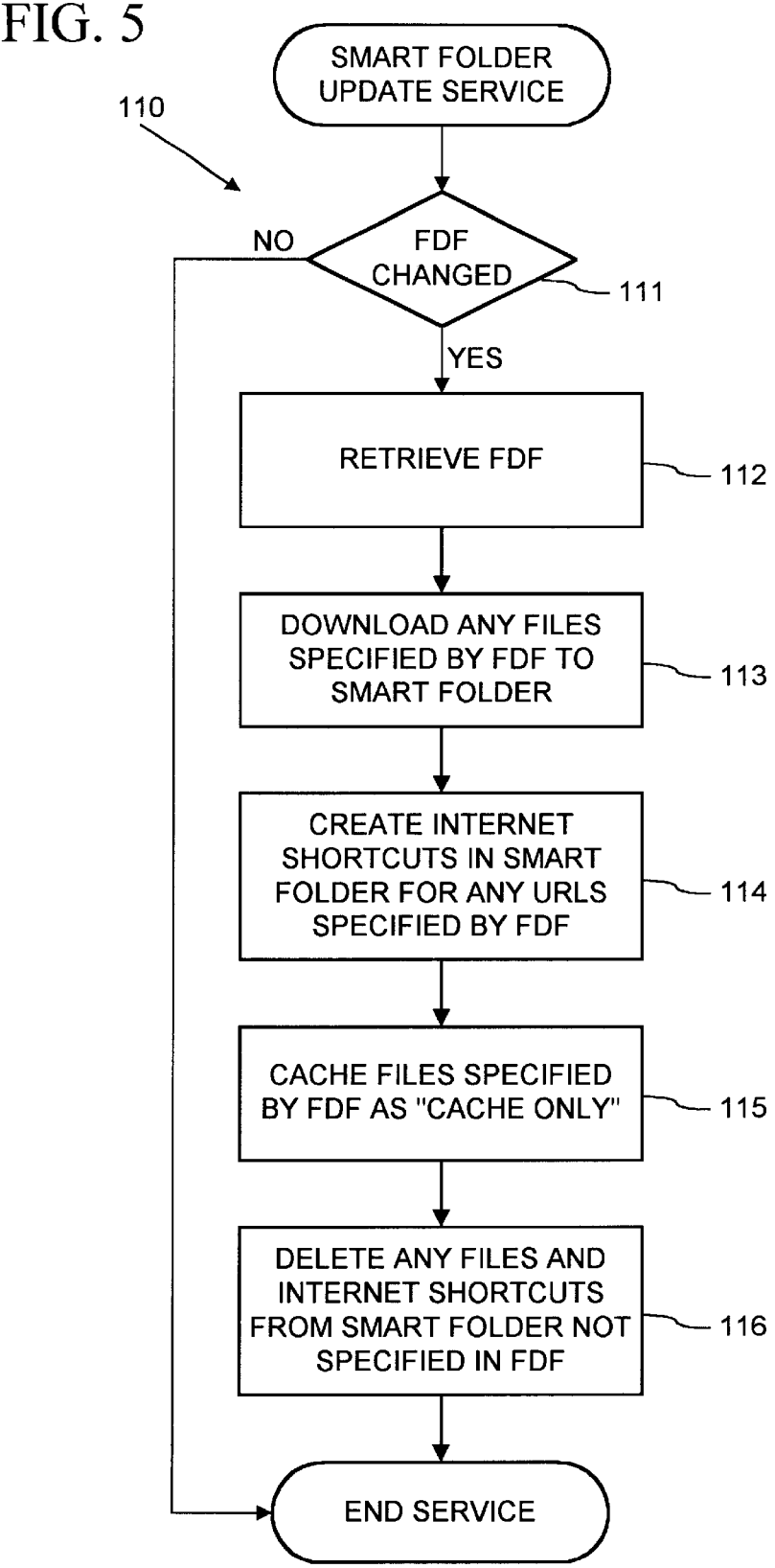
FIG. 5 is a flow chart of the smart folder updating operation of FIG. 4.

[Cache Only]
http://www.foo.com/microsoft/startpaqe.htm
http://www.foo.com/espn/sportszone.htm With reference to FIG. 5, Web Check 53 performs the smart folder updating service 110 for each smart folder 68 (FIG. 4) identified in the system registry 70 along with other updating operations on the scheduled time or detected idle time basis described above. When performing the smart folder updating service for each smart folder, Web Check 53 checks whether the WCF 104 associated with the smart folder 68 as specified in the registry entry has changed (step 111). If the WCF 104 has changed, Web Check 53 retrieves the WCF 104 (step 112) and updates the contents of the smart folder 68 as specified in the WCF (steps 113–115). Web Check 53 also deletes files and Internet shortcuts from the smart folder that are no longer specified in the WCF (step 116).

4. Internet Shortcuts Updating Operation

Figure 6:
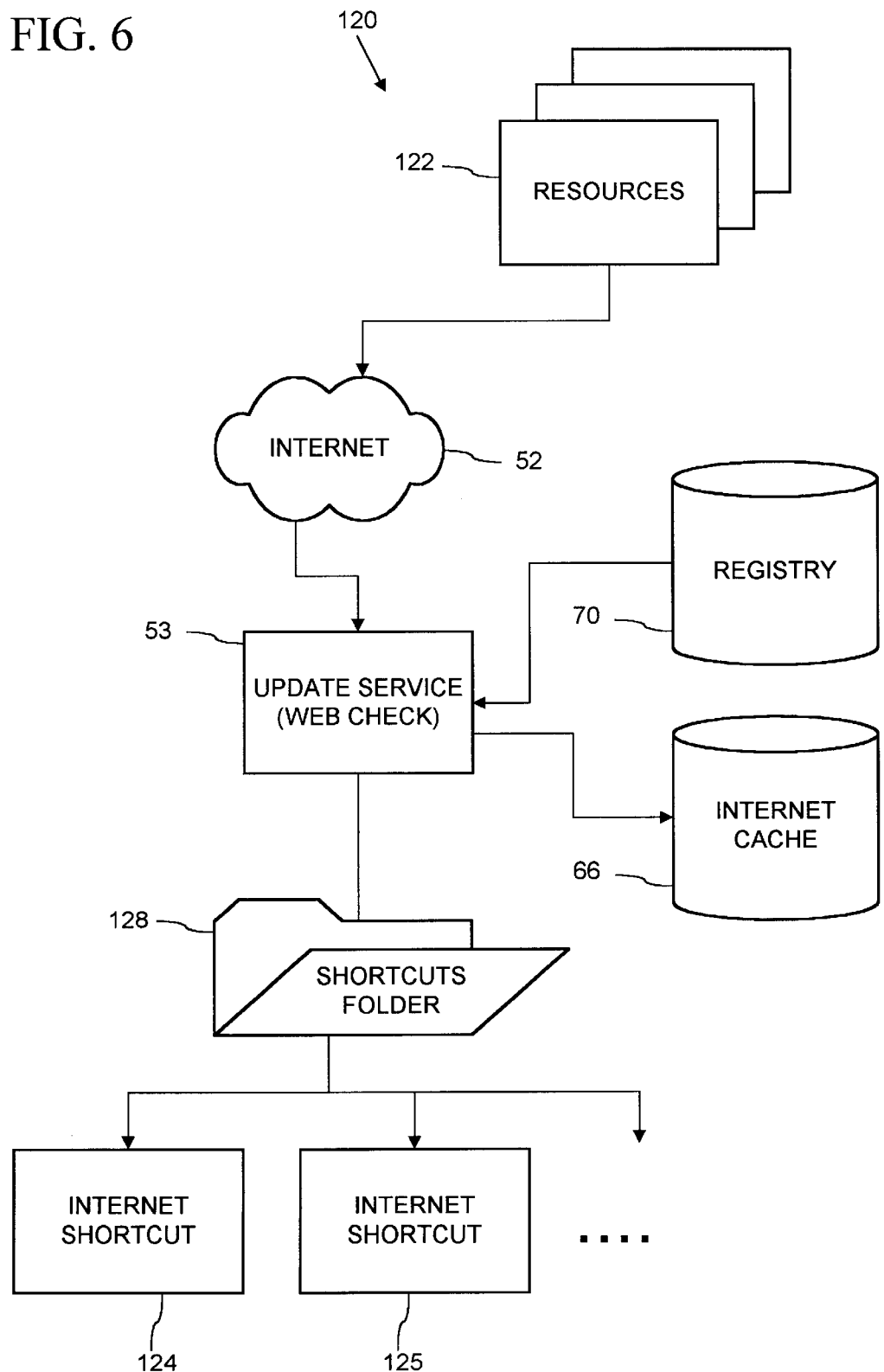
FIG. 6 is a data flow block diagram illustrating a shortcuts updating operation provided in the browsing system of FIG. 2.

With reference now to FIG. 6, Web Check 53 also provides an updating operation 120 referred to herein as "off-line readable Internet shortcut updating." In accordance with this service, Web Check 53 checks remote resources 122 identified by Internet shortcuts 124–125 for updates, and maintains up-to-date copies of the resources stored locally in the Internet cache 66. Internet shortcuts are software objects in the Microsoft® Windows® 95 operating system residing on the local computer 20 and which contain a URL that refers to a resource on a remote server (e.g., World-Wide Web site 58) along with other properties relating to the resource. Software objects and their implementation are described in more detail in the Object Overview section below. The data contained by an Internet shortcut can be persistently stored as a file in a file system folder 128 (hereafter "shortcuts folder").

Figure 7:
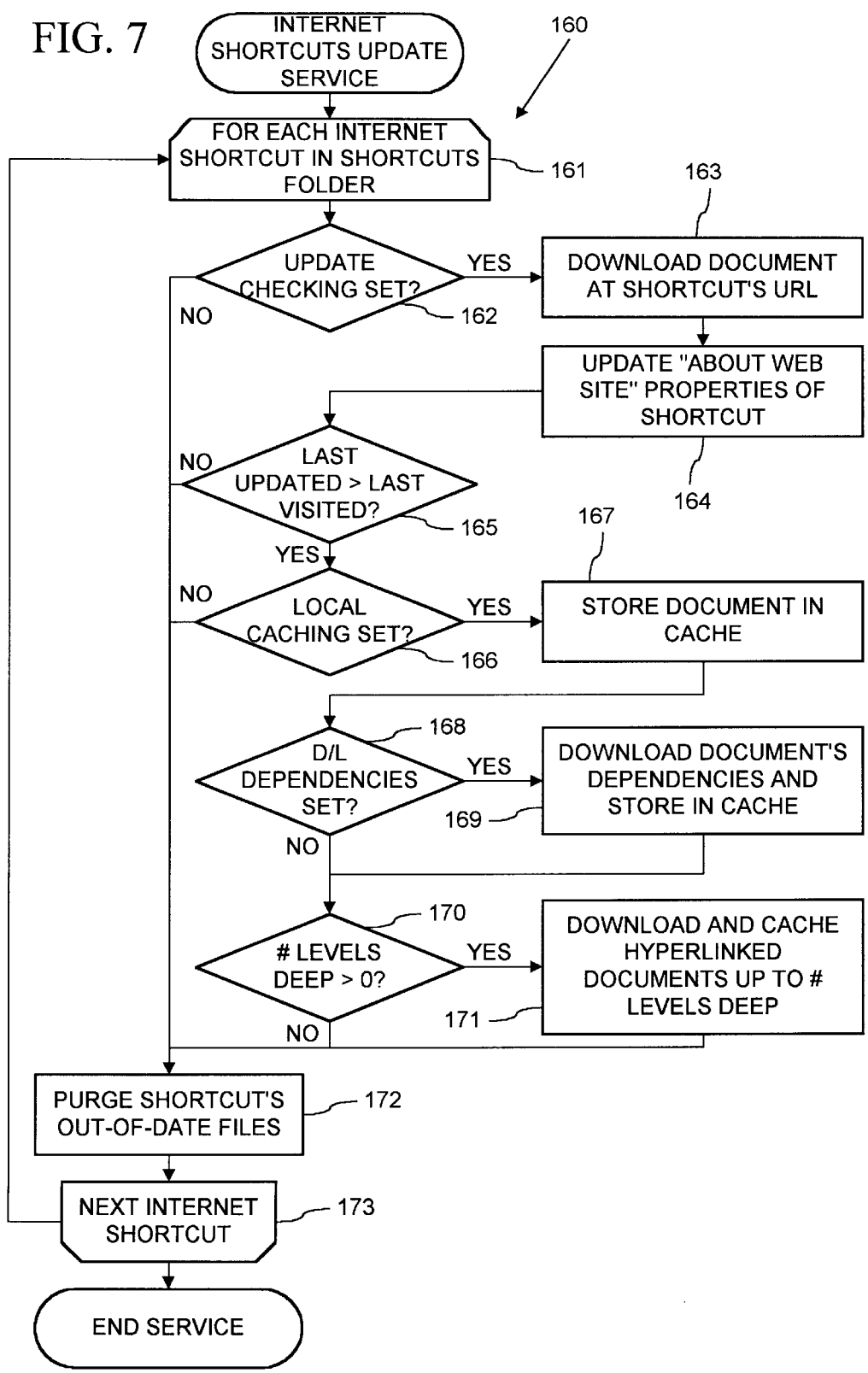
FIG. 7 is a flow chart of the shortcuts folder updating operation of FIG. 6.

With reference to FIG. 7, the Internet shortcuts 124–125 differ from those in the Microsoft Windows 95 operating system in that they are extended to include off-line reading properties according to the invention. The off-line reading properties of these extended Internet shortcuts 124–125 include the properties summarized in the following Table 2

TABLE 2

Internet Shortcut Off-line Reading Properties.

| Property | Definition |
|---|---|
| update checking | This property indicates whether or not Web Check is to check the resource referenced by the Internet shortcut for updates. |
| local caching | This property indicates whether or not Web Check is to maintain a copy of the resource referenced by the Internet shortcut in the Internet cache 66. |
| number of levels deep | This property indicates the extent to which Web Check is to download and locally cache copies of documents referenced by hyperlinks in a hypertext page referenced by the Internet shortcut. For example, if the number of levels deep is set to two Web Check downloads and caches the document directly referenced by the Internet shortcuts, any documents ("first level documents") referenced by hyperlinks in the directly referenced document, and also any documents ("second level documents") referenced by hyperlinks in the first level documents. |
| download dependencies | This property indicates whether Web Check is to download the dependencies of the document pointed to by the Internet shortcut. |
| download size limit | This property indicates a limit in kilobytes and/or as a percentage of total local storage on the data which is locally cached by Web Check for the Internet shortcut. |

In the illustrated system 50 (FIG. 2), the off-line reading properties are set for a particular Internet shortcut in a properties sheet which the user opens by right clicking on an icon of the particular Internet shortcut (such as in the Windows Explorer file management application of the Microsoft Windows 95 operating system or in a folder view), and then selecting a properties command from a pop-up context menu activated by the right clicking.

The extended Internet shortcuts 124–125 (FIG. 6) also include an added group of properties (herein called "about web site" properties) which relate to the update status of the resource 122 that the shortcuts reference. The about web site properties of the Internet shortcuts are summarized in the following table 3.

TABLE 3

Internet Shortcut About Web Site Properties

| Property | Definition |
| --- | --- |
| What's New | A text string description of the newest update or updates to the document. This text string originally is obtained from a text string embedded into the document by its author, such as by using the "meta" HTML tag in a header to the document. |
| Last Visited | A date that the document was last viewed by the user of the computer 20. This information is tracked locally by the Internet browser 51 per user. |
| Last Updated | A date that the document was last updated. This text string also is obtained from information embedded by the author in the remote document by its author, such as by using the "meta" HTML tag in the document's header |
| Number of Visits | A number of times the document was viewed by the user of the computer 20 This information also is tracked locally by the Internet browser 51 per user. |

With reference to FIG. 6 and in accordance with the off-line readable Internet shortcut updating operation, Web Check 53 updates a group of Internet shortcuts 124–125 by maintaining update information relating to each shortcut and also by locally caching updated copies of the remote resources 122 indicated by the shortcuts into the Internet cache 66. In the illustrated system 50 (FIG. 2), Web Check 53 updates Internet shortcuts identified as described above by entries in the system registry 70 which have the 1-bit of the flag value set. As stated in Table 1 above, the path string in this registry entry identifies the shortcuts folder 68 in the file system of the local storage 42 (FIG. 2) where files containing the persistent data of the Internet shortcuts 124–125 are stored. The URL string of these entries is not used. These registry entries also may have the 2-bit of the flag value set to indicate that Internet shortcuts stored in sub-folders of the shortcuts folder identified in the Path string also are to be updated by Web Check 53.

This method of identifying the Internet shortcuts to be updated by Web Check 53 assumes that the user of the computer 20 typically clusters Internet shortcuts together within particular folders in the file system, such as the desktop or favorites folders in a computer running the Microsoft® Windows® 95 operating system. In alternative embodiments of the invention, the Internet shortcuts which are to be updated by Web Check can be listed individually in an entry or entries of the system registry 70 to allow more flexibility in the storage locations of the Internet shortcuts (or, as a further alternative, Internet shortcuts outside of a favorites or like folder can be individually identified in the system registry).

With reference to FIG. 7, Web Check 53 performs the off-line reading Internet shortcut updating service 160 for each shortcuts folder 128 identified in the system registry 70 along with other updating operations on the scheduled time or detected idle time basis described above. In an alternative embodiment of the invention, the agent program that implements the Internet shortcut updating service 160 may update only Internet shortcuts stored in certain preset folders, rather than those identified in the system registry 70.

When performing the off-line reading Internet shortcut updating service 160 for the shortcuts folder 128, Web Check 53 repeats a sequence of updating steps 162–172 for each of the Internet shortcuts 124–125 stored in the shortcuts folder 128 depending on the settings of the particular shortcut's off-line reading properties (step 161).

At steps 162–164, Web Check 53 performs an update checking operation depending on whether the update checking property of the Internet shortcut is set. If the update checking property is set (step 162), Web Check 53 downloads the document referenced by the URL contained in the Internet shortcut from the Internet 52 (step 163). Web Check 53 then parses the document and extracts information from the document to update the shortcut's "about web site" properties, including the "last updated," "what's new," and "author" properties. Web Check stores these properties in the Internet shortcut 124–125.

At steps 165–171, Web Check 53 performs operations to update locally cached data for the Internet shortcut 124–125 depending on other off-line reading properties of the shortcut and on whether the document has been updated since it was last visited. If the document has been updated more recently than the shortcut's "last visited" date (step 165) and the "local caching" property is set (step 166), Web Check 53 stores the downloaded document in the Internet cache 66 (FIG. 6) as indicated at step 167. Web Check 53 sets a flag (e.g., the "STICKY_CACHE_ENTRY" flag in the Internet cache of the Microsoft® Internet Explorer browser) so that the document is not automatically removed during on-line browsing with the Internet browser 51 (FIG. 2). The Internet browser 51 in the illustrated system 50 otherwise automatically replaces documents in the Internet cache 66 on a least recently used basis as new documents are downloaded.

At the steps 168–171, Web Check 53 also maintains up-to-date locally cached copies of related resources. If the shortcut's download dependencies property is set (step 168), Web Check 53 also downloads and locally caches the document's dependencies (step 169). If the number of levels deep property is set to a number greater than zero, Web Check 53 further follows any hyperlinks in the document out to the number of levels set by this property, and downloads those documents indicated by the hyperlinks into the Internet cache 66. The document's dependencies and linked documents also are flagged as exempt from automatic replacement. Web Check 53 limits the local caching at steps 167–171 by the limits set in the download size limit property of the shortcut.

Finally, at step 172, Web Check 53 removes any out-of-date files previously associated with the Internet shortcut from the Internet cache 66, such as copies of the document, its dependencies and levels deep documents from a previous update of the Internet shortcut by Web Check 53. In the illustrated system 50, information identifying the locally cached files associated with each Internet shortcut is stored in a database. Web Check 53 retrieves this information for the particular Internet shortcut 124–125, and verifies that each of the locally cached files associated with the Internet shortcut is still related as the document, one of its dependencies or a levels deep document. If the locally cached file is no longer related to the Internet shortcut, Web Check purges the file from the Internet cache 66.

Web Check 53 then repeats the loop of steps 162–172 for the next Internet shortcut in the shortcuts folder 128 until all shortcuts in the folder have been updated (step 173).

5. Object Overview

Figure 8:
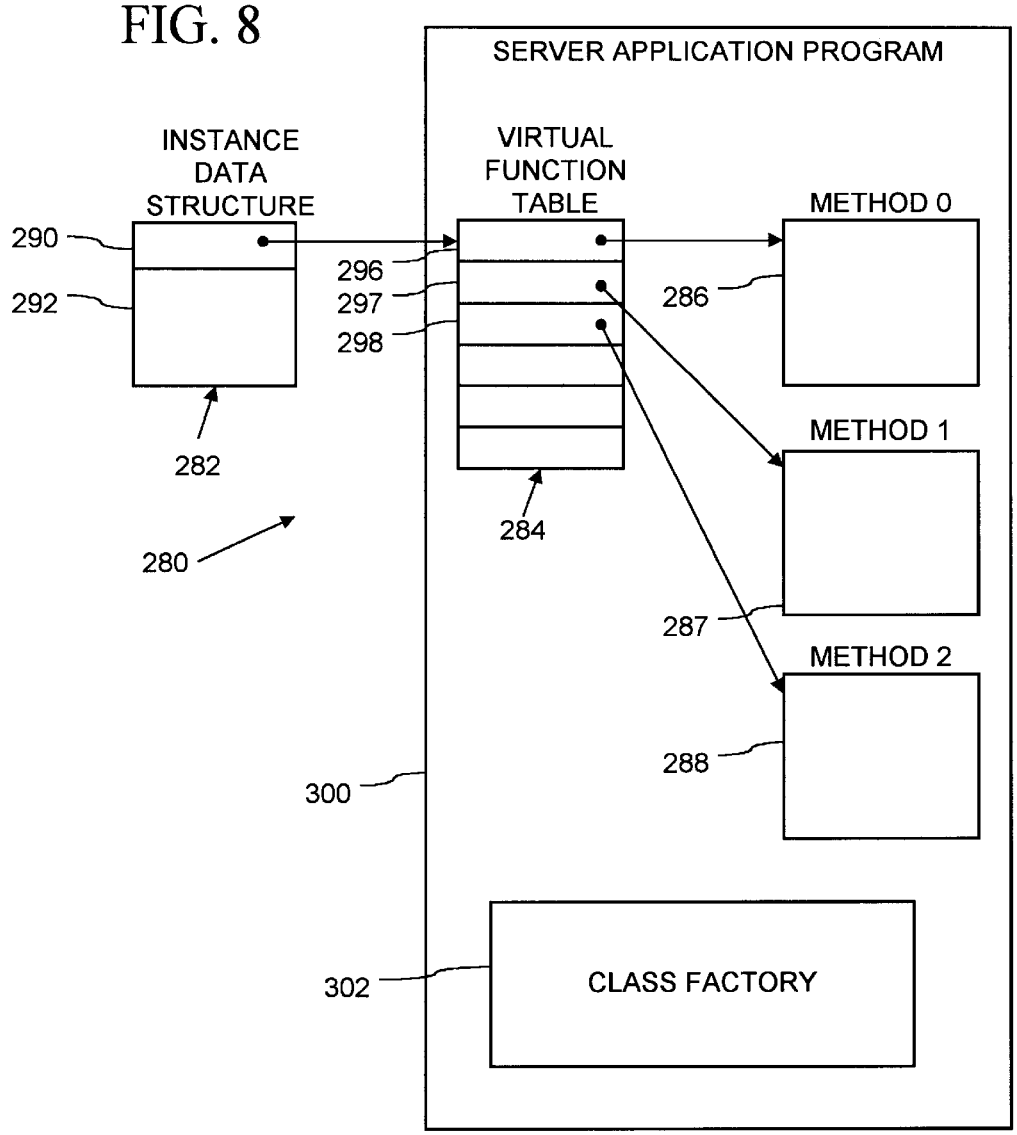
FIG. 8 is a block diagram of typical data structures for an object in the computer system of FIG. 1.

With reference to FIG. 8, Web Check 53 (FIG. 2) and other software in the illustrated system are implemented as objects which conform to Microsoft Corporation's Component Object Model (COM), and support various ActiveX (also known as Object Linking and Embedding ("OLE")) interfaces. COM, ActiveX and OLE are object-oriented technologies which provide integration and interoperability between separate software components. For a detailed discussion of OLE see *Inside OLE, Second Edition* by Kraig Brockschmidt, Microsoft Press, Redmond, Wash. 1995. A brief overview of objects in OLE and associated terminology is provided below before discussing the details of the illustrated embodiment.

An object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class (which for purposes of OLE are the interfaces of the base class).

Microsoft Corporations's COM specification defines binary standards for objects and their interfaces which facilitate the integration of software components. According to the COM specification, a typical object 280 is represented in the system 50 (FIG. 2) by an instance data structure 282, a virtual function table 284, and member functions 286–288. The instance data structure 282 contains a pointer 290 to the virtual function table 284 and data 292 (also referred to as data members, or properties of the object). A pointer is a data value that holds the address of an item in memory. The virtual function table 284 contains entries 296–298 for the member functions 286–288. Each of the entries 296–298 contains a reference to the code 286–288 that implements the corresponding member function.

The pointer 290, the virtual function table 284, and the member functions 286–288 implement an interface of the object 280. Client programs interact with the object 280 by obtaining a pointer (referred to as an interface pointer) to the pointer 290 of the virtual function table 284. OLE includes a type definition of an interface pointer which allows client programs to call member functions on the interface by name through the interface pointer and provides type checking on the function's arguments, as expressed in the following code (in the C++ programming language):

pInterface→MemberFunction( . . . )

By convention, the interfaces of an object are illustrated graphically as a plug-in jack as shown for the document object in FIG. 8. Also, Interfaces conventionally are given names beginning with a capital "I." Objects can include multiple interfaces which are implemented with one or more virtual function tables. The member function of an interface is denoted as "IInterfaceName::FunctionName."

The object 280 conforming to the COM specification exhibits data encapsulation by exposing its interfaces (semantic groupings of its member functions) to client programs. The client programs interact with the object 280 by calling the member functions 286–288 on a particular interface of the object, but do not directly manipulate the object's data. The object 280 also exhibits polymorphism and inheritance in that the object 280 can provide interfaces in common with a base class and other similar objects, so that client programs can interact with each of the objects in the same manner by calling member functions of the interface that the objects have in common.

6. Automation Server Overview

Referring still to FIG. 8, the virtual function table 284 and member functions 286–288 of the object 280 are provided by a server application program 300 which is stored in the computer system 20 (FIG. 1) as an executable program file (with a ".exe" file name extension) or as a dynamic link library file (with a ".dll" file name extension). Dynamic link library files are loaded, dynamically linked, and executed by the Windows® operating system in a same process with a client application program. Executable program files are loaded by the operating system as a separately executing process. In accordance with OLE, the server application 300 includes code for the virtual function table 284 (FIG. 8) and member functions 286–288 (FIG. 8) of the classes that it supports, and also includes a class factory 302 that generates the instance data structure 282 (FIG. 8) for an object of the class.

For a client program (e.g., a document object host or container) to interact with the object 280 provided by the server application 300, the server application must first create the object (i.e., instantiate an object of a class supported by the server application) and the client program must gain an interface pointer to the object 280. In OLE, the client program realizes these events using services provided by OLE and a set of standard object interfaces defined by COM based on class and interface identifiers assigned to the object's class and interfaces. More specifically, the services are available to client programs as application programming interface (API) functions provided in the COM library, which is part of a component of the Windows® operating system in a file named "OLE32.DLL." In OLE, classes of objects are uniquely associated with class identifiers ("CLSIDs"). Class identifiers are 128-bit globally unique identifiers ("GUID") that the programmer creates with an OLE service named "CoCreateGUID" and assigns to the respective classes. The interfaces of an object are associated with interface identifiers ("IIDs").

In particular, the COM library provides an API function, "CoCreateInstance," that the client program can call to request creation of an object to encapsulate a particular documents data using a CLSID associated with the data. The CoCreateInstance API function creates the object and returns a pointer of the requested interface to the client program.

Once the client program has obtained a first interface pointer to the object 280, the client program obtains pointers to other desired interfaces of the object using the interface identifier associated with the desired interface. COM defines several standard interfaces generally supported by OLE objects including the IUnknown interface. This interface includes a member function named "QueryInterface." The QueryInterface function can be called with an interface identifier as an argument, and returns a pointer to the interface associated with that interface identifier. By convention, the IUnknown interface's member functions are included as part of each interface on an object. Thus, any interface pointer that the client program obtains to an interface of the object 280 can be used to call the QueryInterface function.

In a typical situation, however, the only information that the client program has to reference a particular document is a textual name, such as a file name or an Internet URL. In the case of a file name, the COM library provides API functions (e.g., "GetClassFile," "ReadClassStg" and "ReadClassStm") for obtaining a CLSID associated with the file. Client programs also can utilize a system provided object known as a moniker to resolve a name that references a document into an interface pointer on an instantiated object that encapsulates the document's data. These well known mechanisms are described in more detail in *Inside OLE, Second Edition*, supra.

7. Web Check Object Architecture

Figure 9:
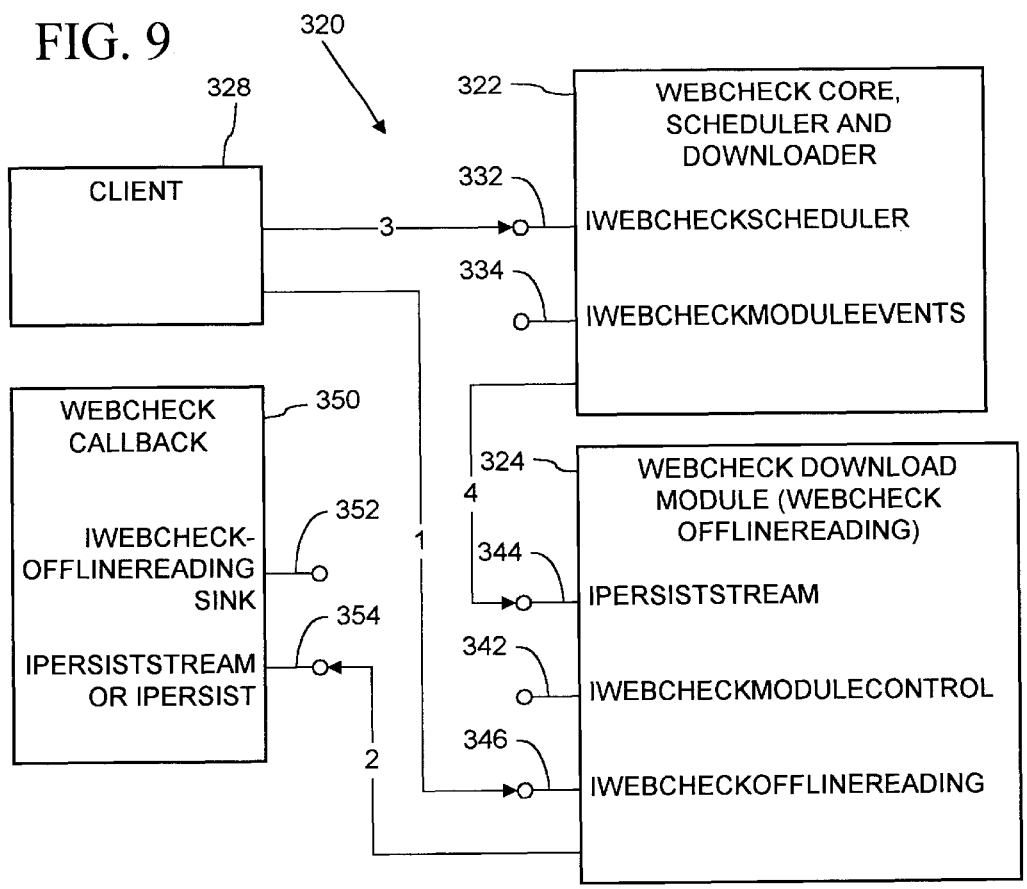
FIG. 9 is a block diagram showing scheduling of an update operation in an object-oriented framework which provides services for periodically recurring operations in the browsing system of FIG. 2.

With reference to FIG. 9, Web Check 53 (FIG. 2) is implemented within an object-oriented framework 320 which includes a Web Check core, scheduler and download objects 322 and Web Check agent objects 324. These objects 322 and 324 conform to the OLE/COM and Active X specifications, and support integration interfaces which allow a client application program 328 (e.g., the Internet browser 51 of FIG. 2) to programmatically utilize updating operations implemented in the agent objects 324 on a periodically recurring basis, e.g., the smart folder updating operation 100 (FIG. 4) and the Internet shortcuts updating operation 120 (FIG. 6), so as to provide an off-line reading feature, and other features based on these services.

The Web Check core, scheduler and download objects 322 are implemented in the illustrated system 50 (FIG. 2) as three separate objects integrated together with private interfaces. These objects manage the infrastructure and scheduling of update operations by the agent objects 324 for Web Check's updating operations 100 (FIG. 4) and 120 (FIG. 6). In the illustrated system 50, a single instance of the core and scheduler objects run on the computer 20 (FIG. 1) in the address space of the operating system's shell at all times that Web Check is enabled. The core object creates the downloader object (also in the shell address space) when there are downloads to complete. The core, scheduler and download objects 322 also support a group of external interfaces summarized in Table 4 below for use by the client application 328 and agent object 324 (two of which, the IWebCheckScheduler interface 332 and IWebCheckModuleEvents interface 334 are shown in FIG. 9).

TABLE 4

Web Check Core, Scheduler and Download Object Interfaces.

| Interface | Description |
| --- | --- |
| IWebCheck | This is the main interface for programmatically controlling Web Check |
| IWebCheckScheduler | This interface manages a schedule of updates. The client creates a agent object for each item to be updated, then schedules the agent object with the scheduler using this interface. |
| IWebCheckScheduleItem | This interface schedules a single update item. The client retrieves a pointer to this interface for an update item from the IWebCheckScheduler interface. |
| IWebCheckScheduleCollection | This interface schedules a collection of update items, which allows programming the client application using a "for each in" syntax of the Microsoft Visual Basic programming language. |
| IWebCheckEnumSchedules | This interface enumerates schedules which have previously been set. |
| IWebCheckModuleEvents | This interface receives notifications from a agent object during a download operation. |
| IWebCheckAdviseSink | This interface sends notifications to a client application which has used the IConnectionPoint interface on the scheduler or Callback property on the agent object. |
| DWebCheckEvents | This interface sends notifications to a client application which has used the IConnectionPoint interface on the scheduler. The D in DWebCheckEvents denotes a dispatch interface which supports late bound calls. |
| IWebCheckDownloader | This interface is used by the agent object to cause Web Check to perform a download operation on a URL. |
| IConnectionPoint | This interface allows a client application to connect to the object 322 so as to receive notifications of Web Check activity. |

The object-oriented framework 320 provides a different separate agent object 324 to handle each of the updating operations described above. The different agent objects in the illustrated framework 320 include a favorites agent object, an off-line reading agent object, and a smart folders agent object. The favorites agent object handles download operations to check Internet shortcuts for changes, and retrieve information for the about web site properties of the Internet shortcut. The off-line reading agent object handles downloads of resources (including dependencies and hyperlinked documents to a specified number of levels deep) indicated by an URL (such as an URL contained in Internet shortcuts) for caching locally and marking with the "sticky" flag. Each agent object 324 provides a user interface dialog for setting its options. Each agent object 324 supports an IWebCheckModuleControl interface 342 and an IPersistStream interface 344, in addition to an agent object-specific interface (i.e., an IWebCheckOfflineReading interface 346 for the off-line reading agent object 324; an IWebCheckFavorites interface for the favorites agent object; an IWebCheckinternetShortcuts interface for the Internet Shortcuts agent object; and an IWebCheckSmartFolders interface for the smart folders agent object). The IPersistStream interface is a well known OLE interface used to persistently store an object's state.

The client application 328 in the illustrated framework 320 can provide a Web Check call back object 350 to receive notifications of Web Check activities from the agent object. The call back object 350 supports interfaces summarized in the following table 5 (of which an IWebCheckOfflineReadingSink interface 352 and an IPersistStream interface 354 are shown).

TABLE 5

Web Check Call Back Object Interfaces

| Interface | Description |
| --- | --- |
| DWebCheckEvents or IWebCheckAdviseSink | This interface is needed by a call back object which uses the IConnectionPoint interface on the Web Check scheduler object to get notifications of Web Check activity. IWebCheckAdviseSink also handles receiving standard notifications from the agent object. |
| IPersistStream | This interface is used to persistently store the state of the client's call back object when the client sets the call back object to receive notifications from a scheduled download. |
| ICustomDownloadModuleAdviseSink (e.g., IWebCheckOfflineReadingSink) | This is a agent object specific interface which handles receiving notifications specific to the agent object. |

7.1 Interfaces For Web Check Core and Scheduler Objects

The IWebCheck interface.

The IWebCheck interface has member functions defined as follows:

HRESULT ShowProperties(HWND hwndParent);
HRESULT StartService( );
HRESULT StopService( );

The ShowProperties function causes the Web Check core object 322 to display the Web Check properties dialog 80 (FIG. 3) to the user. The client application 328 calls this function to allow the user to set Web Check options. This is available instead of allowing programs to directly set Web-Check scheduling options.

The StartService and StopService function start and stop the scheduler service of WebCheck.

The IWebCheckScheduler interface.

The IWebCheckScheduler interface 332 of the Web Check core object 322 has member functions defined as follows:

Parameterized property: IWebCheckScheduleItem ScheduleItem(long Cookie);
Read-only property: IWebCheckScheduleCollection ScheduleItems;
Property: VARIANT_BOOL Busy
HRESULT NewScheduleItem([out] long*pINewCookie, [out]IWebCheckScheduleItem**ppScheduleItem);
HRESULT get_ScheduleItem(long Cookie, [out] IWebCheckScheduleItem*pScheduleItem);
HRESULT DeleteScheduleItem(long ICookie);
HRESULT EnumerateScheduleItems(BSTR IpURL, BSTR bstrCLSID, [out]IWebCheckEnumSchedules** ppEnumSchedules);
HRESULT get_ScheduleItems(BSTR IpURL, BSTR bstrCLSID, [out] IWebCheckScheduleCollection**ppScheduleCollection);
HRESULT RunScheduleItemNow(long ICookie);
HRESULT AbortScheduleItem(long Icookie);
HRESULT AbortEverything( );
HRESULT get_Busy([out] VARIANT_BOOL*fBusy);

The NewSchedulerItem function creates a new schedule item which sets a schedule for a particular download operation with an agent object. The function returns a data structure called the "cookie," and a copy of the schedule item. The cookie is a data value that identifies the schedule item in the scheduler object.

The ScheduleItem function retrieves a reference to the schedule item.

The DeleteScheduleItem function causes the Web Check core object to delete the schedule item associated with the cookie.

The EnumerateScheduleItem function causes the Web Check core object to enumerate the schedule items associated with a particular URL (specified in the IpURL parameter), or a particular agent object (specified in the bstrCLSID parameter). The function returns an IWebCheck-Enum Schedules interface (in the ppEnumSchedules parameter) for enumerating the specified schedules.

The get_ScheduleItems function is called by the client application to enumerate a collection of schedule items associated with a agent object. The function returns a pointer to the IWebCheckScheduleCollection interface.

The RunScheduleItemNow function is called by the client application to cause the Web Check core object to trigger a previously scheduled download operation to update a specified URL (associated with the cookie specified as the ICookie parameter).

The AbortScheduleItem is called by the client application to abort a specified previously scheduled download operation. If the Web Check core object queued the download operation, the function will delete the download operation. If it is currently processing the download operation, the function will abort the download operation.

The AbortEverything function is called by the client application to immediately abort whatever download operations currently being performed by the Web Check core object. The client application should only call this function at the user's request.

The get_Busy function returns the value, TRUE, if any of the agent objects are currently performing download operations.

The IWebCheckScheduleItem interface.

This interface includes functions to set scheduling options for a single schedule item. Each schedule item has associated with it a URL, a trigger settings, and a schedule type. A newly created schedule item will have NULL URL, have no trigger setting, and be of type "Run Later".

Property: BSTR URL
Property: long ScheduleFlags
Property: long MaxDownloadLimit
Property: SAFEARRAY (unsigned char) TaskTrigger
Property: IUnknown DownloadModule
Property: VARIANT_BOOL Disabled
Property (read only): DATE LastRun
Property (read only): DATE LastCompleted
Property (read only): DATE NextRun
Property (read only): long Cookie
HRESULT get_URL([out] BSTR*pURL);
HRESULT put_URL(BSTR pURL);
HRESULT get_ScheduleFlags([out] long*pIScheduleFlags);
HRESULT put_ScheduleFlags(long IScheduleFlags);
HRESULT get_MaxDownloadLimit([out] long*pIMaxDownloadLimit);
HRESULT put_MaxDownloadLimit(long IMaxDownloadLimit);
Property: ScheduleTypeConstants ScheduleType
HRESULT get_ScheduleType([out] ScheduleTypeConstants*psScheduleType);

```
HRESULT put_ScheduleType(ScheduleTypeConstants
    sScheduleType);
HRESULT get_TaskTrigger([out] SAFEARRAY (unsigned
    char)*pTaskTrigger);
HRESULT put_TaskTrigger(SAFEARRAY (unsigned
    char) TaskTrigger);
HRESULT     get_DownloadModule([out]
    IDispatch**ppDisp);
HRESULT put_DownloadModule(IDispatch*pDisp);
HRESULT get_Disabled([out] VARIANT_
    BOOL*pfDisabled);
HRESULT put_Disabled(VARIANT_BOOL fDisabled);
HRESULT get_LastRun([out] DATE*pLastRun);
HRESULT     get_LastCompleted    ([out]
    DATE*pLastCompleted);
HRESULT get_NextRun([out] DATE*pNextRun);
HRESULT get_Cookie([out] long*pICookie);
```

The get_URL and put_URL functions are called by the client application 328 to retrieve and set the URL associated with the schedule item.

The get_ScheduleFlags and put_ScheduleFlags functions are called by the client application 328 to retrieve and set trigger settings associated with the schedule item. Normally, the Web Check scheduler object 322 will trigger the schedule item's download operation only if the URL has changed since it was last run. A constant called schedRun-EvenIfURLUnchanged can be passed as the parameter of the functions to override the normal triggering so that the scheduler object will always trigger the download operation. A constant called schedPerMachineOperation can be passed to indicate the scheduler will run the download operation for any user, not just the user currently logged onto the computer 20.

The get_maxDownLoadLimit and put_MaxDownloadLimit functions are called by the client application to retrieve and set a limit on the maximum size in kilobytes that the scheduler will allow the operation to consume. The download operation will be aborted once it exceeds this limit. A value of 0 (the default) indicates no limit.

The get_ScheduleType and put_SheduleType functions are called by the client application to retrieve and set a schedule type associated with the schedule item. The parameter passed with the function can be one of the following values:

schedRunWithWholeUpdate—will update when Smart Favorites are updated
  schedRunLater—runs only when "RunScheduleItem-Now" method is called (can optionally use TaskTrigger)
  schedRunWhenIdle—will be triggered when we are connected and have idle communications time available.

The get_TaskTrigger and put_TaskTrigger are called by the client application to retrieve and set the trigger setting of the schedule item. The trigger setting is used only if the schedule item's type is set to "schedRunLater," in which case it is still optional. When set, the scheduler objects uses the trigger setting to determine the next time the download operation of schedule item is to run.

The get_DownloadModule and put_DownloadModule functions are called by the client application to retrieve or change the agent object which handles the download operation for the schedule item.

The get_Disabled and put_Disabled functions are called by the client application to retrieve and set the disabled status of the schedule item. If the disabled status is set to TRUE, the schedule item's download operation will not be run unless the RunScheduleItemNow method is called in the scheduler object.

The get_LastRun, get LastCompleted, and get NextRun are called by the client application to retrieve the date and time that this schedule item was last triggered, that it last completed running, and that it will next be run given current options. The value may be 0 if invalid or not available.

The get_Cookie function is called by the client application 328 to obtain the cookie that identifies the schedule item in the scheduler object 322.

The IWebCheckEnumSchedules interface.

This interface is retrieved from the Web Check scheduler object using functions of the IWebCheckScheduler interface. The IWebCheckEnumSchedules interface has member functions to enumerate schedule items for a single URL or agent object 324, which are defined as follows:

```
HRESULT Next(ULONG celt, [out]long*ICookies, [out]
    ULONG*pcFetched);
HRESULT Skip(ULONG celt);
HRESULT Reset( );
HRESULT                          Clone([out]
    IWebCheckEnumSchedules**ppIEnum);
```

The Next function is called by the client application to retrieve cookies identifying schedule items associated with the URL or agent object one at a time in the enumeration. The client application can then use the cookie in a call to the IWebCheckScheduler::GetSchedule function described above. The Skip function jumps one schedule item forward in the enumeration, while the Reset function returns to the beginning of the enumeration.

The IWebCheckScheduleCollection interface.

This interface is intended for client applications written in the Microsoft Visual Basic programming language to allow use of the "for each in/next" syntax of that language in enumerating schedules. The interface has member functions defined as follows:

```
HRESULT _NewEnum([out]IUnknown**ppEnum);
HRESULT                       NewEnum([out]
    IWebCheckEnumSchedules**ppEnum);
```

The _NewEnum function returns an interface to an object implemented as the IEnum VARIANT data structure of Visual Basic. The NewEnum function returns the IWebCheckEnumSchedules interface.

The IWebCheckModuleEvents interface.

The scheduler object 322 uses this interface to receive notifications from the agent object 324 and thereby keep track of active agent objects and their status. The interface has member functions defined as follows:

```
HRESULT UpdateBegin(long ICookie, SCODE scReason,
    BSTR IpURL, IUnknown*punkModule);
HRESULT UpdateProgress(long ICookie, long
    ISizeDownloaded, long ICurrent, long IMax, BOOL
    fExternalEvent);
HRESULT UpdateEnd(long ICookie, SCODE scReason,
    long IFlags);
HRESULT UpdateBegin(long ICookie, SCODE scReason,
    BSTR IpURL);
HRESULT UpdateProgress(long ICookie, long ICurrent,
    long IMax);
HRESULT UpdateEnd(long ICookie, SCODE scReason);
```

The UpdateBegin function notifies the scheduler object that the agent object has begun a download operation. The lCookie parameter contains an identifier which is unique for the life of the agent object. The scReason parameter indicates a reason that this operation is being run by the agent object. The lpURL parameter designates the URL used in the download operation. The punkModule parameter points to the agent object. The function may return a value to indicate that no further notification relating to the download operations need be made by the agent object to the scheduler object.

The UpdateProgress function is called by the agent object to notify the scheduler object periodically of the progress of the download operation. The lSizeDownloaded parameter indicates the entire size of the data that has been downloaded so far. The lCurrent parameter indicates the current position in the download, starting at 0 and increasing in value as the download progresses. The lMax parameter indicates the maximum size of the download operation. (The lMax parameter may be −1 if the maximum value is unknown.) The agent object is required to call this method when anything changes. If the scheduler object passes the notifications to the client application connected by an event sink, it returns true as the fExternalEvent parameter. This allows the agent object to cut back on the number of UpdateProgress calls when the fExternalEvent parameter is false.

The UpdateEnd function is called by the agent object to notify the scheduler that the download operation is completed. The scReason parameter indicates whether the download operation ended successfully, or was aborted/failed. The lFlags parameter indicates the result of the download operation using values defined by the agent object. The schedNotifyOnDelete parameter indicates that the scheduler object must notify the agent object before deleting the schedule item so that the agent object can performs cleanup (such as removing the "sticky" flag marking from resources stored in the Internet cache 66 to allow their removal).

The IWebCheckAdviseSink interface.

This interface is used as an advise sink to notify the client application of Web Check activities. The scheduler object 322 uses this interface to pass status notification from the agent object 324 on to the client application 328 when it has set global connections to the scheduler 322. The agent object 324 also uses the interface to communicate directly with the client application 328 when the client application has set callbacks on that specific agent object. The client application may instead or also support agent object specific advisory interfaces (defined by the agent object) for richer information reporting. The IWebCheckAdviseSink interface has member functions similar to like named functions of the IWebCheckModuleEvents interface described above, which are defined as follows:

HRESULT UpdateBegin(long lCookie, SCODE scReason, BSTR lpURL);
HRESULT UpdateProgress(long lCookie, long lCurrent, long lMax);
HRESULT UpdateEnd(long lCookie, SCODE scReason);

The DWebCheckEvents interface.

This interface is similar to the IWebCheckAdviseSink interface, but is implemented as a dispatch interface. The interface has member functions similar to like named functions of the IWebCheckAdviseSink interface, which are defined as follows:
HRESULT UpdateBegin(long lCookie, SCODE scReason, BSTR lpURL);
HRESULT UpdateProgress(long lCookie, long lCurrent, long lMax);
HRESULT UpdateEnd(long lCookie, SCODE scReason);

7.2 Interfaces for Web Check Download Modules

The IWebCheckModuleControl interface.

This interface provides member functions which are called from the Web Check scheduler object 322 during a download operation. The member functions are defined as follows:

HRESULT ScheduleTriggered(long lCookie, LPCWSTR lpURL, SYSTEMTIME pstTriggered, IUnknown*punkScheduleAdvise);
HRESULT PauseUpdate(SCODE scReason);
HRESULT ResumeUpdate( );
HRESULT AbortUpdate(SCODE scReason);

The ScheduleTriggered function is called from the scheduler object 322 when the download operation is to start. The lCookie parameter identifies the schedule item of the agent object. The punkScheduleAdvise parameter passes a pointer to the scheduler object's IWebCheckModuleEvents interface, which the agent object uses to notify the scheduler object of its status during the download operation.

The PauseUpdate function is called by the scheduler object 322 to cause the agent object 324 to stop downloading after any current downloads complete. The scheduler object 322 uses this function to control download operations performed at detected idle times and to suspend lower-priority downloads. In response to the call, the agent object 322 maintains its state until it is resumed or aborted.

The ResumeUpdate function is called by the scheduler object 322 to cause the agent object to start downloading again after the PauseUpdate function suspends a download operation.

The AbortUpdate function is called by the scheduler object 322 to cause the agent object to abort whatever operation it may be performing. The scheduler object 322 may abort an update operation of the agent object for the following reasons: the user requests to abort, the maximum download size limit is reached, and the computer becomes disconnected from the Internet 52 (FIG. 2). In response, the agent object immediately aborts any downloads. The agent object still notifies the scheduler object (via the punkScheduleAdvise→UpdateEnd function) when it's complete.

7.3 Interfaces for Off-line Reading Download Module

The IWebCheckOfflineReading interface is implemented by the Off-line Reading agent object 324 to allow setting and retrieval of all off-line reading options for an individual URL, Internet shortcut, or like entity. This interface has member functions defined as follows:

Property:IUnknown*Callback
Property:long RecurseFlags
Property:long RecurseLevels
Property:BSTR SiteMapToFollow
Property:long MaxSize
Property:BSTR SiteMapToCreate
HRESULT get_Callback([out] IUnknown**ppunkCallback);
HRESULT put_Callback(IUnknown*punkCallback);
HRESULT get_RecurseFlags([out]long*plFlags);
HRESULT put_RecurseFlags(long lFlags);

HRESULT get_RecurseLevels([out] long*pIRecurseLevels);
HRESULT put_RecurseLevels(long IRecurseLevels);
HRESULT get_SiteMapToFollow([out]BSTR*pURL);
HRESULT put_SiteMapToFollow(BSTR URL);
HRESULT get_MaxSize([out]long*pIMaxSize);
HRESULT put_MaxSize(long IMaxSize);
HRESULT get_SiteMapToCreate([out]BSTR*pPath);
HRESULT put_SiteMapToCreate(BSTR Path);

The put_Callback and get_Callback functions set or retrieve a call back (e.g., the Web Check call back object 350 of the client application 328) that the off-line reading agent object 324 uses to provide notifications relating to an update operation. The call back object 350 must support IPersistStream as well as IWebCheckOfflineReadingSink.

The get_RecurseFlags and put_RecurseFlags functions are called to set and retrieve flags controlling the off-line reading agent object's update operation. One or more of the flags shown in Table 6 can be set.

TABLE 6

Off-line Reading agent object Recurse Flags.

| Flag | Description |
| --- | --- |
| WCOffReadMakeHTMLSticky | Make HTML sticky in cache |
| WCOffReadMakeImagesSticky | Make dependencies sticky in cache |
| WCOffReadDownloadSomeImages | Cache some dependencies (non-background images/sounds/avis) |
| WCOffReadDownloadAllImages | Cache all dependencies |
| WCOffReadLinksToOtherSites | Recurse - follow links other sites |
| WCOffReadLinksTowardHomePage | Otherwise will follow only links to same or lower 'level' on same site. |
| WCOffReadOnlyLinksInHTMLSiteMap | Will follow only links to site map referenced in HTML. If this flag is not set, WebCheck will ignore any site maps referenced in the HTML but will use "SiteMapToFollow" if it is set. |
| WCOffReadIgnoreIfHTMLUnchanged | Only recurse or cache dependencies from that page if HTML has changed. |

The get_RecurseLevels and put_RecurseLevels functions retrieve and set the number of levels deep of hyperlinked documents to be downloaded in the update operation. The IRecurseLevels parameter indicates the number of levels of hyperlinked documents to follow recursively, and also download. When set to zero, the parameter indicates to not follow any links and download only top level page.

The get_MaxSize and put_MaxSize functions retrieve and set a limit on the amount of downloading performed for the update operation. The off-line reading agent object will stop downloading in the update operation when the limit is reached. Setting the limit to zero indicates no maximum size limit (which is the default).

The get_SiteMapToFollow and put_SiteMapToFollow functions retrieve and set a site map property of the off-line reading agent object 324. A site map is a file at a World-Wide Web site which includes a directory listing of resources that reside at the site. Setting the site map property causes the off-line reading agent object 324 to limit the recursive downloading of hyperlinked documents in the update operation to only those denoted in the site map at the root HTML page of the subject URL of the update operation. In other words, the agent object 324 does not follow or download documents at hyperlinks from the URL of the update operation that are not in the URL's site map. A URL of a specific custom site map can be passed in the pURL property to override using the site map at the root HTML page. If the site map property is not set, the off-line reading agent object 324 does not look at a site map unless the appropriate bit in RecurseFlags is set and a site map is referenced in the root HTML page.

The get_SiteMapToCreate and put_SiteMapToCreate sets or gets a local stored site map for off-line use. This site map will be created based on the URLs that the off-line reader downloads.

The IWebCheckOfflineReadingSink interface.

This interface is implemented on the client application's call back object 350 to receive notifications specific to the off-line reading agent object 324. The agent object 324 provides progress notifications for an update operation on a single URL and all its associated URLs (i.e., dependencies and levels deep documents). The agent object 324 retrieves the documents depth-first, then dependencies (i.e., the top level or subject URL first, then first and subsequent levels deep URLs up to the maximum levels deep setting, and finally the dependencies of each URL). This interface has member functions defined as follows:

HRESULT UpdateInitialize(long ICookie, BSTR URL, [out]long*pIOptions);
HRESULT UpdateBegin( );
HRESULT UpdateProgress(long ILevel, long INum, long IMax);
HRESULT UpdateFinishedOneHTML(BSTR URL, long IFlags);
HRESULT UpdateEnd(SCODE scReason);

The client application's call back object 350 can return a value, "E_ABORT," to the off-line reading agent object 324 from any of these functions to request that the agent object stop the operation.

The UpdateInitialize function is called first and only once by the off-line reading agent object at the start of an update operation. The IpURL parameter of the function indicates the subject URL of the update operation. The off-line reading agent object passes a pointer to its IWebCheckOfflineReading interface as the pOfflineReading parameter. The client application's call back object 350 returns flags controlling which notifications the off-line reading agent object sends to the call back object in the pIOptions parameters. These flags can include an WCOffReadNotifyProgress flag to indicate the call back object's UpdateProgress( )function may be called periodically with progress updates, and an WCOffReadNotifyEachHTML flag to indicate the call back object's UpdateFinishedOneHTML( ) function will be called for each HTML URL successfully downloaded.

The UpdateBegin function is called once by the off-line reading agent object 324 at the start of downloading the top-level URL.

The UpdateProgress function is called by the off-line reading agent object 324 to indicate the progress of the update operation. The off-line ILevel parameter passed in the function call be the off-line reading agent object indicates the update operation's progress (ILevel==1, 2, 3 for level of recursion currently being downloaded, and ILevel==−1 if dependencies being downloaded). The INum and IMax parameters represent current file number and maximum file number out of the files downloaded in the update operation, although the off-line reading agent object need not call the function for every file downloaded in the update operation.

The UpdateFinishedOneHTML function is called by the off-line reading agent object as soon as a given HTML URL has been downloaded. The off-line reading agent object passes a value as the IFlags parameter as shown in Table 7 below.

TABLE 7

UpdateFinishedOneHTML Flags

| Flag | Description |
| --- | --- |
| WCOffReadURLUnchanged | Off-line reading agent object has detected that the URL has not changed from the last time we downloaded it. |
| WCOffReadWillFollowLinks | Off-line reading agent object will follow hyperlinks from this page one or more levels. |
| WCOffReadWillDownloadImages | Off-line reading agent object will download images on this page. |

The UpdateEnd function is called once by the off-line reading agent object 324 when the subject URL of the update operation, and all linked documents and dependencies are done downloading. The agent object 324 also may be called if the update operation is aborted. The value passed as the scReason parameter will indicate which case.

7.4 Interfaces for The Favorites Web Check Download Module

The favorites agent object which implements the Internet shortcut updating operation 120 of FIG. 6 comprises two separate objects a favorites object and an Internet shortcut object. The Web Check scheduler 322 always keeps at least one favorites object scheduled. This favorites object controls checking all URLs in the Internet browser's favorites list and on the desktop for updates (e.g., the Internet shortcuts stored in the favorites folder and the desktop folder in the computer's file system). The favorites object also is responsible for enumerating all scheduled Internet shortcut objects to check for updates at the same time as the favorites folder. More specifically the favorites object operates by creating an Internet Shortcut object and using it to check each of the shortcuts found in the Favorites folder. The favorites object then enumerates the Internet Shortcut objects through the scheduler object 322 to find any other Internet shortcuts to check.

The IWebCheckFavorites interface.

The favorites object provides an IWebCheckFavorites interface which allows the client application to control overall checking of URLs stored as Internet shortcuts in the favorites and desktop folders of the computer's file system. The IWebcheckFavorites interface has member functions defined as follows:

Property: VARIANT_BOOL CheckFavoritesFolder
Property: VARIANT_BOOL CheckFavoritesSubFolders
Property: VARIANT_BOOL CheckDesktop
Property: VARIANT_BOOL CheckInternetShortcuts
Property: IUnknown*Callback
HRESULT get_CheckFavoritesFolder([out]VARIANT_BOOL*fCheckFavoritesFolder);
HRESULT put_CheckFavoritesFolder(VARIANT_BOOL fCheckFavoritesFolder);
HRESULT get_CheckFavoritesSubFolders([out] VARIANT_BOOL*fCheckFavoritesSubFolders);
HRESULT put_CheckFavoritesSubFolders(VARIANT_BOOL fCheckFavoritesSubFolders);
HRESULT get_CheckDesktop([out]VARIANT_BOOL*fCheckDesktop);
HRESULT put_CheckDesktop(VARIANT_BOOL fCheckDesktop);
HRESULT get_CheckInternetShortcuts([out]VARIANT_BOOL*fCheckInternetShortcuts);
HRESULT put_CheckInternetShortcuts(VARIANT_BOOL fCheckInternetShortcuts);
HRESULT get_Callback([out] IUnknown**ppunkCallback);
HRESULT put_Callback(IUnknown*punkCallback);

The functions in the IWebCheckFavorite interface get and set properties of the favorites object which include a CheckFavoritesFolder value (default TRUE), a CheckFavoritesSubFolder value (default (TRUE), a Check Desktop value (default FALSE), and a CheckInternetShortcuts value (default TRUE). These value control whether the favorites object checks Internet shortcuts for updates that are contained in the favorites folder 202 (FIG. 2), favorites subfolders (e.g., the favorites category folders 204–205 of FIG. 2), the desktop folder, and Internet shortcuts stored elsewhere that are individually scheduled through the Internet shortcut by a client application (e.g., the Internet browser 51), respectively. The get_Callback and put_Callback functions retrieve and set the call back object of the client application to which the favorites object sends notifications. The call back object must support the PersistStream interface as well as the IWebCheckAdviseSink interface described above.

The IWebCheckInternetURL interface.

The Internet shortcut object for a scheduled Internet shortcut implements this interface. The client application uses the interface to check a single URL to see if it's changed since the last time the Internet shortcut object was executed. The locally cached copy of the document indicated by the URL can be removed from the Internet cache 66 (FIG. 2). The Internet shortcut object uses the about web site properties obtained from the HTML document header as described above (if available) or a cyclic redundancy check ("CRC") checksum calculated on the file to determine if the target of the Internet shortcut's URL has changed. The Internet shortcut checks only the target of the URL for updates, and not any indirectly referenced URLs such as frames in a frameset. The IWebCheckInternetURL interface has member functions defined as follows:

Property:IUnknown*Callback
Property:VARIANT_BOOL IsInternetShortcut
HRESULT get_Callback([out] IUnknown**ppunkCallback);
HRESULT put_Callback(IUnknown*punkCallback);
HRESULT get_IsInternetShortcut([out]VARIANT_BOOL*fIsInternetShortcut);
HRESULT put_IsInternetShortcut(VARIANT_BOOL fIsInternetShortcut);

The get_Callback and put_Callback functions retrieve and set the call back object of the client application to which the Internet shortcut is to send notifications of its activities. The call back object must support the IPersistStream interface as well as the IWebCheckAdviseSink interface described above. The Internet shortcut object passes the value S_TRUE as the scReason parameter in a call to the UpdateDone function of the IWebCheckAdviseSink interface on the call back object to indicate the URL has changed, and S_FALSE if the URL has not changed. The Internet shortcut object passes S_FALSE the first time it runs an update check for the URL.

The get_IsInternetShortcut and put_IsInternetShortcut functions retrieve and set the IsInternetShortcut property of the Internet shortcut object which controls whether the Internet shortcut object updates the about web site properties displayed in the dialog 130 of FIG. 8. If set to FALSE, the Internet shortcut object checks only whether the URL has changed since it was last checked by the Internet shortcut object.

7.5 Interfaces for Smart Folders Download Module

The smart folders updating operation 100 of FIG. 4 is handled with a smart folders agent object. The smart folders agent object provides an IWebCheckSmartFolders interface to allow client applications to programmatically control the smart folders updating operation 100. The IWebCheckSmartFolders interface has member functions defined as follows:

Property:BSTR LocalDirectory;
Property:long IOptions
Property:long IMaxSize;
Property:IUnknown*Callback
HRESULT get_LocalDirectory([out]BSTR*IpDirectory);
HRESULT put_LocalDirectory(BSTR IpDirectory);
HRESULT get_Options([out]long*pIOptions);
HRESULT put_Options(long IOptions);
HRESULT get_MaxSize([out]long*pIMaxSize);
HRESULT put_MaxSize(long IMaxSize);
HRESULT get_Callback([out] IUnknown**ppunkCallback);
HRESULT put_Callback(IUnknown*punkCallback);

These functions set and retrieve properties of the smart folders agent object that control aspects of the smart folder updating operation 100 (FIG. 4). The LocalDirectory property is the location of the smart folder updated by the agent object. The LMaxSize property specifies a maximum size of the data to download into this directory. The Callback property determines the callback object to which the smart folders agent object send activity notifications, which must support the IPersistStream and IWebCheckAdviseSink interfaces.

8. Programmatically Scheduling and Executing Web Check Update Operations.

With reference still to FIG. 9, the client application uses the interfaces described above to programmatically request, monitor, and control update operations by Web Check 53 (FIG. 2). The use of the interfaces to schedule an update operation using an off-line reading update operation as an example is illustrated in FIG. 9.

The client application 328 begins scheduling an off-line reading update operation by creating an instance of the off-line reading agent object 324. The client application 328 then calls functions described above from the IWebCheckOfflineReading interface 346 on the agent object 324 to set up all of the off-line reading options, such as the recursion depth, dependencies, maximum size limit, and other options. The client application also creates a callback object and passes a pointer to the callback object (i.e., a pointer to the callback object's IPersistStream interface 354) in a call to the put_Callback function on the IWebCheckOffline reading interface 346.

The client application 328 next calls the NewScheduleItem function of the IWebCheckScheduler interface 332 of the Web Check scheduler object 322 to schedule the update operation of the off-line reading agent object 324. The scheduler object 322 returns a pointer to a IWebCheckScheduleItem interface for the client application to set options of the schedule item controlling the scheduled times of the off-line reading update operation. The client application calls functions on the IWebCheckScheduleItem interface to set the URL, the scheduled download times, and the off-line reading agent object in the schedule item.

Finally, the scheduler object 322 uses the IPersistStream interface 344 on the off-line reading agent object to persist the object so that it can be unloaded from the main memory 40 (FIG. 1) until the scheduled time of the update operation. The off-line reading agent object in turn uses the IPersistStream interface on the callback object 350 to persist the call back object.

Figure 10:
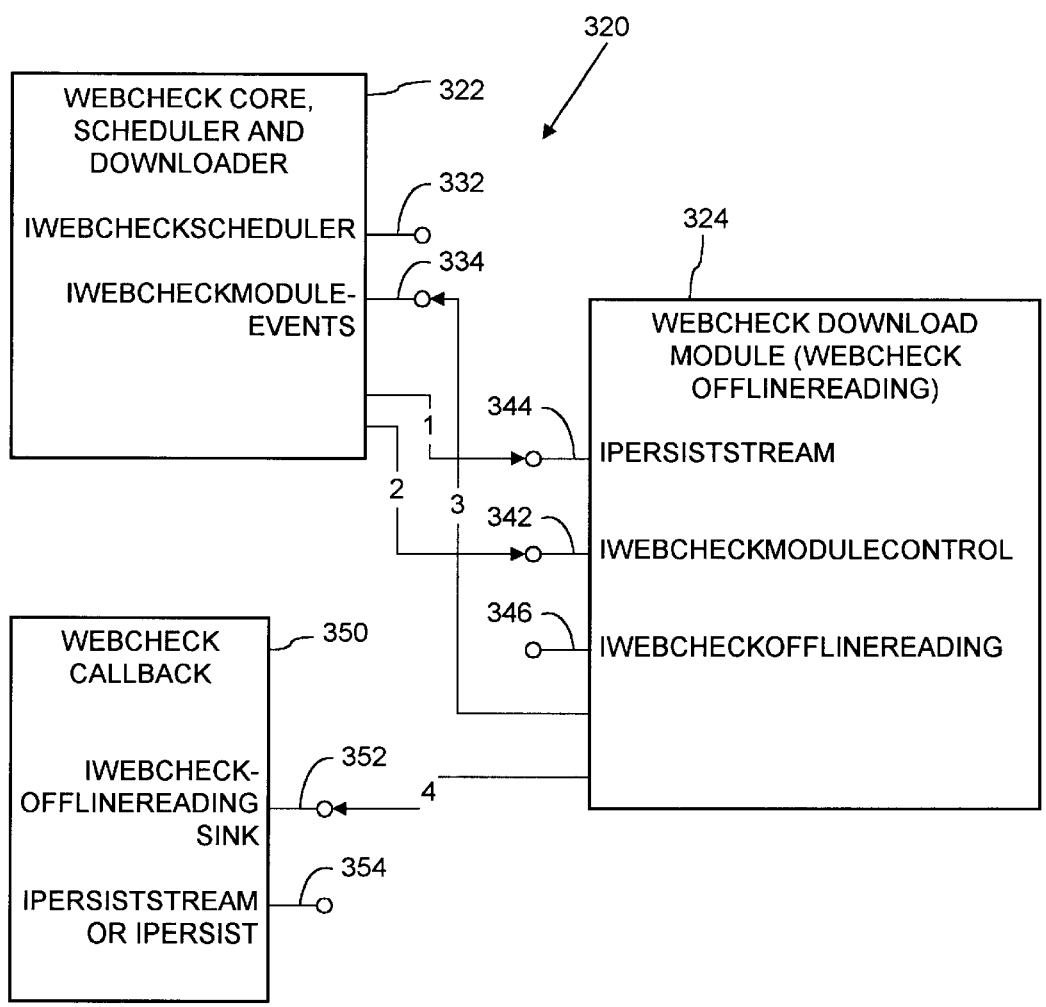
FIG. 10 is a block diagram showing execution of an update operation in the object framework of FIG. 9.

The use of the Web Check interfaces to execute the off-line reading update operation is illustrated in FIG. 10. When the next scheduled time set for the schedule item for the update operation arrives, the scheduler object 322 uses the IPersistStream interface to reload the off-line reading agent object 324 and restore its persisted state. The off-line reading agent object 324, in turn, reloads and restores the persisted state of the client application's call back object 350 using its IPersistStream interface.

The scheduler object 322 then calls the ScheduleTriggered function of the IWebCheckModuleControl interface 342 on the off-line reading agent object 324. This causes the off-line reading agent object to commence its update operation. The off-line reading agent object begins downloading any files that need to be updated into the Internet cache 66 as described above. As files are downloaded, the off-line reading agent object calls functions of the IWebCheckModuleEvents interface 334 on the scheduler object 322 and of the IWebCheckOfflineReadingSink interface 352 on the client application's callback object 350 to notify them of the status of the update operation. The scheduler object 322 passes notifications received via its IWebCheckModuleEvents interface to other client applications that have connected via the IConnectionPoint to receive the notifications on these other client application's IWebCheckAdviseSink or DWebCheckEvents interfaces.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. An object-oriented framework for scheduling an operation to be performed by an agent object on a periodically recurring basis in a computer, comprising:

a scheduler object;

a scheduler object integration interface supported on the scheduler object for use by a client application program to set programmatically a schedule item associated with the agent object, said schedule item indicating the periodically recurring basis on which to cause the agent object to perform the operation, whereby the client application program programmatically controls the performance of the operation on the scheduled basis;

the scheduler object operating responsive to the client application program programmatically setting the schedule item with the scheduler object integration interface to cause the agent object to be persistently stored in the computer, and to cause the agent object to be restored and initiate the operation by the agent object on the periodically recurring basis.

2. The object-oriented framework of claim 1 further comprising:

an agent object integration interface defined on the agent object for use by the client application program to set parameters controlling the operation performed by the agent object.

3. The object-oriented framework of claim 1 further comprising:

a call back object integration interface defined on a call back object of the client application program for receiving notifications of a status of the operation;

an agent object integration interface defined on the agent object for use by the client application to set a call back parameter of the agent object so as to provide the notifications to the client application program through the call back object integration interface.

4. The object-oriented framework of claim 3 further comprising:

a persist object integration interface defined on the call back object to cause the call back object to be persistently stored on the computer; and the agent object operating to cause the call back object to be persistently stored using the persist object integration interface when the client application program sets the call back parameter of the agent object and to cause the call back object to be restored when the operation is initiated on the periodically recurring basis.

5. The object-oriented framework of claim 1 further comprising:

an advisement sink object integration interface defined on a monitoring client application program for receiving advisements of a status of the operation;

an events object integration interface supported on the scheduler object for receiving the advisements from the agent object; and a connection object integration interface supported on the scheduler object for use by the monitoring client application program to set a connection to the scheduler object so that the scheduler object passes the advisements received from the agent object to the monitoring client application program through the advisement sink object integration interface.

6. The object-oriented framework of claim 1 comprising:

an abort function in the scheduler object integration interface for use by the client application program to cause the scheduler to abort the operation by the agent object.

7. The object-oriented framework of claim 1 wherein the periodically recurring basis includes at network idle times, and the scheduler object operates to detect a network idle time by checking for activity on a network connection and to cause the agent object to initiate the operation at the detected network idle time.

8. The object-oriented framework of claim 1 wherein the periodically recurring basis includes at scheduled times, and the scheduler object operates to determine when the scheduled times occur and to cause the agent object to initiate the operation at the scheduled times.

9. The object-oriented framework of claim 1, comprising:

the agent object having code operative when the operation is performed to check for a change to be made to locally stored data, to download remotely stored data if the change has occurred, and to update said locally stored data with the downloaded data if the change has occurred.

10. The object-oriented framework of claim 1, comprising:

the agent object having code operative when the operation is performed to check whether an item located at a remote server on a network has changed, and if so to download the item from the remote server to the computer so as to update a copy of the item stored locally on the computer, wherein the agent object is located on the computer.

11. An object oriented framework in a computer system for programmatically maintaining an updated, locally stored copy of remote data for off-line use, comprising:

an update operation object providing an interface callable from a client application to set properties relating to an update operation for maintaining a local copy of the remote data, whereby the client application programmatically configures properties relating to the update operation;

a scheduler object providing an interface callable from the client application to set times on a periodic basis at which to perform the update operation of the update operation object, whereby the client application programmatically controls the performance of the operation on the scheduled basis;

a downloader object residing locally and operating responsive to the update operation object and the scheduler object to check the remote data for changes at the times and download the remote data so as to update the local copy when the remote data is determined to have changed, whereby the client application programmatically maintains an updated local copy of the remote data.

12. The object oriented framework of claim 11 wherein:

the scheduler object is operative responsive to calls from the client application to set the times as on a detected idle time basis; and the downloader object operating responsive to the scheduler object to detect times during a user's on-line session when a network connection is idle by checking for activity on the network connection, and to perform the checking and downloading the remote data at the detected idle times.

13. The object oriented framework of claim 11 wherein the remote data is a file containing information for specifying remote resources to be stored in a local folder associated with the file, and the downloader object operates responsive to the update operation object to download and store the remote resources in the local folder.

14. The object oriented framework of claim 11 wherein the remote data is a file for specifying pointers to remote resources, and the downloader object operates responsive. to the update operation object to store shortcut files containing the pointers.

15. A method of downloading data to a computer unattended from a remote server on a network, comprising:

specifying the data to download from the remote server prior to a user's on-line session, wherein the data comprises a plurality of items;

during the user's on-line session wherein the computer is connected to the network for the user to interactively download other data from the network,
    detecting a time when the connection to the network is otherwise idle by checking for activity on the connection, wherein the detecting is based on a duration of time that the connection has been idle, and wherein the duration of time for detecting that the connection is idle varies for each of the plurality of items in relation to the size of the item;
    downloading the specified data from the remote server at the detected idle time; and
    locally storing the data at the computer whereby the data is available at the computer for off-line use after the connection is terminated.

16. The method of claim 15 wherein the step of detecting a time when the connection to the network is otherwise idle further comprises:
    determining that the connection to the network is idle based on a length of the time elapsed since a last activity occurred on the connection.

17. The method of claim 15 further comprising:
    downloading the items when idle time is detected in order of increasing size.

18. The method of claim 15 further comprising:
    determining to download a first of the items having a first size when the connection has been idle for a first duration related to the first size; and
    determining to download a second of the items having a second size larger than the first size if the connection continues to remain idle for a second duration longer than the first duration.

19. A method in a computer of maintaining an updated local copy of data from a remote server on a network, comprising:
    specifying the data residing at the remote server of which a local copy is to be kept updated, wherein the data comprises a plurality of items;
    during a user's on-line session wherein the computer is connected to the network for the user to interactively download other data from the network,
        detecting a time when the connection to the network is otherwise idle by checking for activity on the connection, wherein the detecting is based on a duration of time that the connection has been idle, and wherein the duration of time for detecting that the connection is idle varies for each of the plurality of items in relation to the size of the item;
        downloading the specified data from the remote server at the detected idle time; and
        updating the local copy to the downloaded data whereby the data is available at the computer for off-line use after the connection is terminated.

20. The method of claim 19 wherein the step of detecting a time when the connection to the network is otherwise idle further comprises:
    determining that the connection to the network is idle based on a length of the time elapsed since a last activity occurred on the connection.

21. A method of downloading data to a computer from a remote server on a network, comprising:
    specifying the data to download from the remote server, wherein the data comprises a plurality of items;
    establishing an active browsing network connection to the network;
    during a user's on-line session wherein the computer is connected to the network for the user to interactively download other data from the network through the active browsing network connection,
        detecting a time when the active browsing network connection is idle by checking for activity on the active browsing network connection as a whole, wherein the detecting is based on a duration of time that the active browsing network connection has been idle, and wherein the duration of time for detecting that the active browsing network connection is idle varies for each of the plurality of items in relation to the size of the item; and
        downloading the specified data from the remote server at the detected idle time through an idle time network connection that is different from the active browsing network connection.

22. The method of claim 21 wherein the detecting of a time when the active browsing network connection is idle further comprises:
    determining that the active browsing network connection is idle based on a length of the time elapsed since a last activity occurred on the active browsing network connection.

23. A method in a client computer of automatically updating locally stored data from a remote server on a network, the method comprising:
    associating a set of one or more folders in a file system of the client computer with a folder specification file residing at the remote server, wherein the folder specification file specifies one or more items of data, and wherein the folder specification file further specifies for at least one item of the one or more items of data a location for storage in the set of one or more folders in the file system of the client computer;
    downloading the folder specification file to the client computer from the remote server; and
    for each item out of the one or more items specified in the folder specification file,
        downloading the item from the network; and
        storing the data of the downloaded item in the set of one or more folders, wherein if the folder specification file specifies for the item a location for storage in the set of one or more folders, the item is stored at the specified location.

24. The method of claim 23 comprising: periodically checking whether the folder specification file has changed; and when the folder specification file has changed:
    downloading the folder specification file to the client computer from the remote server;
    based upon the folder specification file, deciding by the client computer how to update the set of one or more folders associated with the folder specification file; and
    updating the set of one or more folders associated with the folder specification file.

25. The method of claim 23 wherein the data of at least one of the items comprises a pointer to a remote resource located on a second remote server.

26. A method of downloading data to a computer unattended from a remote server on a network, comprising:
    specifying the data to download from the remote server prior to a user's on-line session;
    establishing a network connection to the network through a network programming interface, wherein the network programming interface exposes a time-check function for monitoring activity on the network connection;
    during the user's on-line session wherein the computer is connected to the network through the network connection for the user to interactively download other data from the network, calling the time-check function exposed by the network programming interface, wherein the time-check function returns a time value based upon the last activity on the network connection;

comparing the time value to a threshold idleness interval;

if the comparison indicates idleness on the network connection, downloading the specified data from the remote server; and locally storing the data at the computer, whereby the data is available at the computer for off-line use after the connection is terminated.

27. The method of claim 26 wherein the time value is elapsed time since the last activity on the network connection, and wherein the comparison indicates idleness on the network connection when the time value is less than the threshold idleness interval.

28. The method of claim 26 wherein the time value indicates the time of the last activity on the network connection.

29. The method of claim 26 wherein downloading the specified data occurs on an idle-time network connection through the network programming interface.

30. The method of claim 26 wherein the network programming interface exposing the time-check function includes a non-idle-time network connection.

31. The method of claim 26 wherein the specified data comprises a plurality of items, the method comprising:

downloading the items in order of increasing size.

32. The method of claim 26 wherein the network programming interface is a network socket programming interface for use in a windowed operating system environment.

33. A method of downloading data to a computer unattended from a remote server on a network, comprising:

specifying the data to download from the remote server prior to a user's on-line session, wherein the data comprises a plurality of items;

during the user's on-line session wherein the computer is connected to the network for the user to interactively download other data from the network, detecting that the connection to the network is idle based on a comparison of the duration of time that the connection has been idle to an idleness threshold, where the idleness threshold varies for each item in relation to the size of the item;

downloading the specified data from the remote server at the detected idle time.

34. The method of claim 33 further comprising downloading the plurality items when idle time is detected in order of increasing size.

35. The method of claim 33 further comprising:

determining to download a first of the items having a first size when the connection has been idle for a first duration related to the first size; and determining to download a second of the items having a second size larger than the first size if the connection continues to remain idle for a second duration longer than the first duration.

* * * * *